(12) United States Patent
Oh et al.

(10) Patent No.: US 11,194,732 B2
(45) Date of Patent: Dec. 7, 2021

(54) STORAGE DEVICE AND METHOD OF OPERATING THE SAME

(71) Applicant: SK hynix Inc., Icheon-si (KR)

(72) Inventors: Yun Sik Oh, Gwangju-si (KR); Seok Jin Kwon, Suwon-si (KR)

(73) Assignee: SK hynix Inc., Icheon-si (KR)

( * ) Notice: Subject to any disclaimer, the term of this patent is extended or adjusted under 35 U.S.C. 154(b) by 113 days.

(21) Appl. No.: 16/584,482

(22) Filed: Sep. 26, 2019

(65) Prior Publication Data
US 2020/0233812 A1 Jul. 23, 2020

(30) Foreign Application Priority Data

Jan. 17, 2019 (KR) .................. 10-2019-0006417

(51) Int. Cl.
*G06F 12/10* (2016.01)
*G06F 12/1009* (2016.01)

(52) U.S. Cl.
CPC .. *G06F 12/1009* (2013.01); *G06F 2212/1008* (2013.01)

(58) Field of Classification Search
CPC .... G06F 3/0644; G06F 3/0647; G06F 3/0658; G06F 3/0688; G06F 12/1009; G06F 12/0246; G06F 2212/1008; G11C 16/10; G11C 16/0483
See application file for complete search history.

(56) References Cited

U.S. PATENT DOCUMENTS

| | | | | |
|---|---|---|---|---|
| 2008/0177937 A1* | 7/2008 | Nishihara | ........... | G06F 12/0246 711/103 |
| 2010/0095046 A1* | 4/2010 | Reid | .................. | G06F 12/0246 711/102 |
| 2011/0072199 A1* | 3/2011 | Reiter | ................. | G06F 12/0246 711/103 |
| 2012/0314492 A1* | 12/2012 | Shin | ....................... | G11C 13/00 365/163 |
| 2013/0138867 A1* | 5/2013 | Craft | ....................... | G06F 3/061 711/103 |
| 2017/0097773 A1* | 4/2017 | Camp | ................... | G06F 3/0608 |
| 2017/0139839 A1* | 5/2017 | Ke | ......................... | G06F 3/0679 |

FOREIGN PATENT DOCUMENTS

| | | |
|---|---|---|
| KR | 10-2008-0078129 | 8/2008 |
| KR | 10-2013-0088173 | 8/2013 |
| KR | 10-2018-0031853 | 3/2018 |

\* cited by examiner

*Primary Examiner* — Hiep T Nguyen
(74) *Attorney, Agent, or Firm* — Perkins Coie LLP

(57) ABSTRACT

A memory controller for controlling a memory device including a plurality of pages is provided. The memory controller comprises: an input data controller configured to receive data to be stored in a page selected from among the plurality of pages; a sequence information generator configured to generate sequence information indicating a sequential order of a program operation of storing the data in the first page based on sequential orders of program operations performed before the program operation; and a write operation controller configured to control the memory device to store the data in a first area of the first page and to store history information in a second area of the first page, wherein the history information includes a physical address of the first page and the sequence information corresponding to the data.

16 Claims, 13 Drawing Sheets

STORAGE DEVICE AND METHOD OF OPERATING THE SAME

CROSS-REFERENCE TO RELATED APPLICATION

This patent document claims priority to and benefits of the Korean patent application number 10-2019-0006417 filed on Jan. 17, 2019, which is incorporated herein by reference in its entirety.

TECHNICAL FIELD

Various embodiments of the disclosed technology generally relate to an electronic device, and more particularly, to a storage device and a method of operating the storage device.

BACKGROUND

Storage devices refer to electronic components that are used to store data on a permanent or temporary basis. Each storage device may include one or more storage mediums to store data and may further include a memory controller configured to control the memory device to store or retrieve data. The storage device can be classified based on the type of storage medium. For example, a hard disk drive (HDD) uses a magnetic disk as the storage medium, and a solid-state drive (SSD) or a memory card uses, as the storage medium, semiconductor memory devices such as a volatile memory device and a nonvolatile memory device.

A volatile memory device is a memory device that can retain its data only when power is supplied. Thus, such a volatile memory device loses its data in the absence of power. Examples of the volatile memory device include a Static Random Access Memory (SRAM) and a Dynamic Random Access Memory (DRAM).

On the other hand, a nonvolatile memory device is a memory device that can retain its data even in the absence of power. Examples of the nonvolatile memory device include a Read Only Memory (ROM), a Programmable ROM (PROM), an Electrically Programmable ROM (EPROM), an Electrically Erasable and Programmable ROM (EEPROM), and a flash memory.

SUMMARY

Various embodiments of the disclosed technology relate to a storage device and its operating method, which provide improved capabilities including operation pattern analysis and failure analysis.

In one aspect, the disclosed technology provides a memory controller for controlling a memory device including a plurality of pages. The memory controller may include an input data controller configured to receive data to be stored in a page selected from among the plurality of pages, a sequence information generator configured to generate sequence information indicating a sequential order of a program operation of storing the data in the first page based on sequential orders of program operations performed before the program operation; and a write operation controller configured to control the memory device to store the data in a first area of the first page and to store history information in a second area of the first page, wherein the history information includes a physical address of the first page and the sequence information corresponding to the data.

In another aspect, the disclosed technology provides a method of operating a memory controller for controlling a memory device including a plurality of pages. The method may include receiving data to be stored in a page selected among the plurality of pages; generating sequence information to include i) a physical address of the selected page and ii) a sequence number indicating a sequential order of an operation of storing the data in the selected page; and providing the memory device with a command for storing the data in a first area of the selected page and storing history information in a second area of the selected page.

In another aspect, the disclosed technology provides a storage device. The storage device may include a memory device including a plurality of pages, each page including a first area and a second area, and configured to perform a program operation of storing data in a first page selected from among the plurality of pages; and a memory controller configured to generate sequence information indicating a sequential order of a the program operation of storing the data in the first page, based on sequential orders of program operations performed before the program operation, and to control the memory device to store the data in a first area of the first page and history information including a physical address of the first page and the sequence information in a second area of the first page.

DETAILED DESCRIPTION

The technology disclosed in this patent document can be implemented in embodiments to provide a storage device having improved capabilities including operation pattern analysis and failure analysis.

Specific structural or functional descriptions in the embodiments of the present disclosure introduced in this specification or application are only for description of the embodiments of the present disclosure. The descriptions should not be construed as being limited to the embodiments described in the specification or application.

Figure 1:
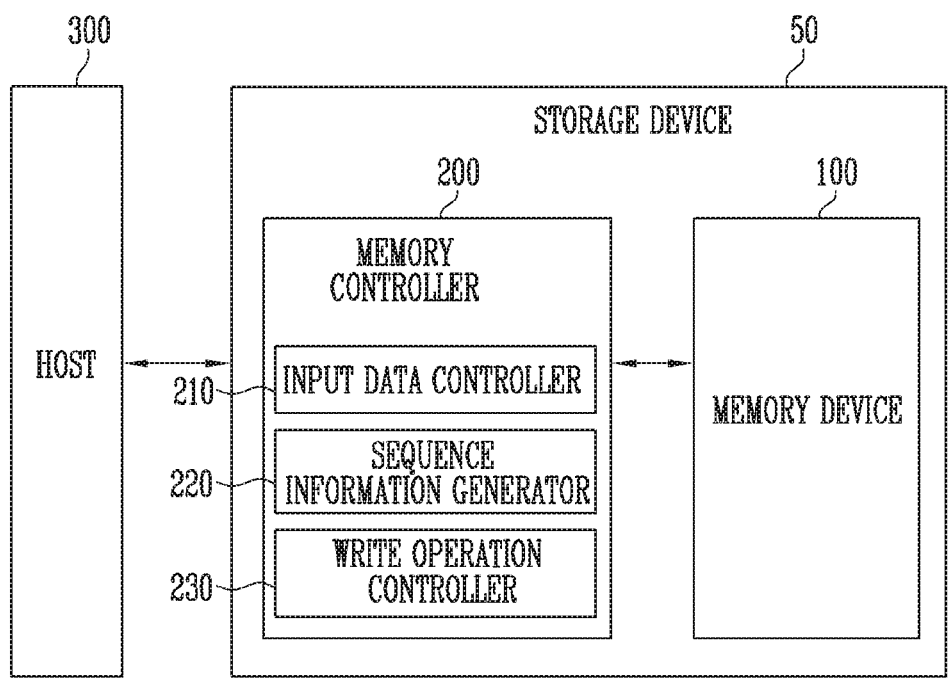
FIG. 1 is a diagram lustrating an example of a storage device based on an embodiment of the disclosed technology.

FIG. 1 is a diagram illustrating a storage device according to an embodiment of the present disclosure.

Referring to FIG. 1, a storage device 50 may include a memory device 100 and a memory controller 200. The storage device 50 may be used to store and retrieve data according to requests from a host 300, such as a mobile phone, a smartphone, an MP3 player, a laptop computer, a desktop computer, a game console, a television (TV), a tablet personal computer (PC), or an in-vehicle infotainment system.

The storage device 50 may be manufactured as any one of various types of storage devices depending on a host interface that is a communication interface between the host 300 and the storage device 50. The storage device 50 may be implemented as any one of various types of storage devices, for example, a solid state drive (SSD), a multimedia card such as an MMC, an embedded MMC (eMMC), a reduced size MMC (RS-MMC), or a micro-MMC, a secure digital card such as an SD, a mini-SD, or a micro-SD, a universal storage bus (USB) storage device, a universal flash storage (UFS) device, a personal computer memory card international association (PCMCIA) card-type storage device, a peripheral component interconnection (PCI)-card type storage device, a PCI express (PCI-E) card-type storage device, a compact flash (CF) card, a smart media card, and a memory stick.

The storage device 50 may be manufactured in any one of various types of package forms. For example, the storage device 50 may be manufactured in any one of various types of package forms, such as package on package (POP), system in package (SIP), system on chip (SOC), multi-chip package (MCP), chip on board (COB), wafer-level fabricated package (WFP), and wafer-level stack package (WSP).

The memory device 100 may provide a storage space where data to be processed and/or instructions to be executed are stored. The memory device 100 may include the logic needed to read from and write to the memory device 100 and be operated in response to requests from the memory controller 200. The memory device 100 may include a memory cell array including a plurality of memory cells which are configured to store data therein.

Each of the memory cells may be implemented in various manners to store data. In some implementations, the memory cells can store a single bit or more bits of information In some implementations, the memory cells may be implemented as a single-level cell (SLC) storing a single data bit, a multi-level cell (MIX) storing two data bits, a triple-level cell (TLC) storing three data bits, or a quad-level cell (QLC) storing four data bits.

The memory cell array may include a plurality of memory blocks. Each memory block may include a plurality of pages, and each pages corresponds to a plurality of memory cells. A single memory block may include a plurality of pages. In an embodiment of the disclosed technology, read and program (write) operations are performed on a page basis, and erase operations are performed on a block basis.

In an embodiment, the memory device 100 may take many alternative forms, such as a double data rate synchronous dynamic random access memory (DDR SDRAM), a low power double data rate fourth generation (LPDDR4) SDRAM, a graphics double data rate (GDDR) SDRAM, a low power DDR (LPDDR) SDRAM, a Rambus dynamic random access memory (RDRAM), a NAND flash memory, a vertical NAND flash memory, a NOR flash memory device, a resistive RAM (RRAM), a phase-change memory (PRAM), a magnetoresistive RAM (MRAM), a ferroelectric RAM (FRAM), or a spin transfer torque RAM (STT-RAM). In this patent document, for convenience of description, a description will be made on the assumption that the memory device 100 is a NAND flash memory.

The memory controller 200 can access the memory device 100 based on requests from the user/host by providing command/address signals to the memory controller 200. In some implementations, the memory device 100 may receive, from the memory controller 200, a command and an address in which the command is performed or executed, and may access the area of the memory cell array selected by the address. Thus, the memory device 100 may perform an operation in the area identified by the address based on the command requested by the user/host. For example, the memory device 100 may perform a write operation (i.e., program operation), a read operation, or an erase operation. During a program operation, data is written to the area (e.g., memory cell area) of the memory device 100, which is identified by the address. During a read operation, data is read from the area of the memory device 100, which is identified by the address. During an erase operation, data is erased from the area of the memory device 100, which is identified by the address.

The memory controller 200 controls the overall operation of the storage device 50.

When power is applied to the storage device 50, the memory controller 200 may run firmware (FW). When the memory device 100 is a flash memory device, the memory controller 200 may run firmware such as a Flash Translation Layer (FTL) for controlling communication between the host 300 and the memory device 100. In an implementation, a flash translation layer (FTL) may be situated in the memory controller 200 to implement logical-to-physical mapping, garbage collection, wear leveling management, and bad block management. For example, the FTL may provide an interface between a host interface layer and a flash interface layer.

In an embodiment, the memory controller 200 may receive data and a logical block address (LBA) from the host 300, and may translate the logical block address (LBA) into a physical block address (PBA) indicating where the memory cells to write data to or read data form are in the memory device 100.

The memory controller 200 may control the memory device 100 so that a program operation, a read operation or an erase operation is performed based on a request received from the host 300. During a program operation, the memory controller 200 may provide a program command, a physical block address, and data to the memory device 100. During a read operation, the memory controller 200 may provide a read command and a physical block address to the memory device 100. During an erase operation, the memory controller 200 may provide an erase command and a physical block address to the memory device 100.

In an embodiment, the memory controller 200 may autonomously generate a program command, an address, and data regardless of a request from the host 300, and may transmit them to the memory device 100. For example, the memory controller 200 may provide commands, addresses, and data to the memory device 100 so as to perform background operations, such as a program operation for wear leveling and a program operation for garbage collection.

In an embodiment, the memory controller 200 may control more than one memory device 100 at the same time. In this case, the memory controller 200 may control the memory devices 100 depending on an interleaving scheme to improve operating performance. The interleaving scheme may improve system performance by performing more than one operation at a given time frame. For example, the interleaving scheme may perform operations on two or more memory devices 100 at the same time by interleaving a part of a queue associated with a memory device with a part of another queue associated with another memory device.

In an embodiment, the memory controller 200 may include an input data controller 210, a sequence information generator 220, and a write operation controller 230.

The input data controller 210 may receive data to be stored in the memory device 100 from the host 300 or the memory device 100. The received data may be stored in a page among a plurality of pages included in the memory device 100. In an embodiment, the input data controller 210 may receive, from the host 300, the data to be stored in the memory device 100 and a logical address of the data.

In an embodiment, the input data controller 210 may receive the data to be stored in the memory device 100 from the memory device 100. In this case, the received data may be obtained from the memory device 100 by performing a read operation on another area of the memory device 100, which is different from the area of the memory device 100 in which the data is to be stored. For example, when a background operation is performed based on the request from the memory controller 200, the data stored in another area of the memory device 100 may be read from the memory device 100 and the data read from another area of the memory device 1000 may then be stored in the identified area of the memory device 100.

Thus, the input data controller 210 may receive the data to be stored in the memory device 100 from the host 300 or the memory device 100 and provide the received data as input data to the write operation controller 230.

The sequence information generator 220 may generate sequence information including a sequence number (turn) indicating a sequential ordering of a program operation of storing the input data in the memory device 100. The sequence information generator 220 may generate the sequence information in consideration of the operating status of the memory device 100. For example, the sequence information generator 220 may count the total number of program operations to be performed by the memory device 100. The sequence information generator 220 may determine the sequence information depending on the counted total number of program operations to be performed by the memory device 100.

In an embodiment, the sequence information generator 220 may generate sequence information including a sequence number indicating a sequential order of a program (write) operation to store data in a corresponding page. For example, the sequence number indicates the sequential order when a program (write) operation of storing data is performed in the page among the plurality of pages included in the memory device 100.

The write operation controller 230 may control the memory device 100 so that the memory device 100 stores the input data in one or more pages included in the memory device 100. The write operation controller 230 may control the memory device 100 to store the input data in a main area of a page of the plurality of pages. As will be explained with reference to FIG. 7 later, the page is configured to include a main area and a spare area.

The write operation controller 230 may control the memory device 100 so that history information is stored in a spare area of the page in which the data is stored. The history information may include i) a physical address of the memory device 100 in which the input data is to be stored and ii) the sequence information corresponding to the input data. The physical address of the memory device 100 may indicate a physical address of the page in which the input data is to be stored.

As discussed above, the memory controller 200 can receive the input data from the memory device 1000. In an embodiment, when the input data is provided from the memory device 100, the input data may be obtained by reading data stored in another page which is different from the page in which data is to be stored. In this case, the history information may include a physical address of another page from which the input data is read and sequence information corresponding to the data read from another page. Since the sequence number indicates a sequential order that a program (write) operation of storing data is performed in a corresponding page, the sequence information of the data read from another page may include a sequence number indicating a sequential order of a program operation which was performed to store the read data in another page. In other words, the sequence information of the read data may include a sequence number indicating when a program operation of storing read data in another page was performed. In some implementations, the sequence number of data may indicate a relative sequential order of a program (write) operation for storing the data among program operations performed by the memory device.

The write operation controller 230 may generate program operation performance information indicating that the program operation of storing the input data has been performed.

The host 300 may communicate with the storage device 50 using at least one of various communication methods such as Universal Serial Bus (USB), Serial AT Attachment (SATA), Serial Attached SCSI (SAS), High Speed Interchip (HSIC), Small Computer System Interface (SCSI), Peripheral Component interconnection (PCI), PCI express (PCIe), Nonvolatile Memory express (NVMe), Universal Flash Storage (UFS), Secure Digital (SD), MultiMedia Card (MMC), embedded MMC (eMMC), Dual In-line Memory Module (DIMM), Registered DENIM (RDIMM), and Load Reduced DIMM (LRDIMM) communication methods.

Figure 2:
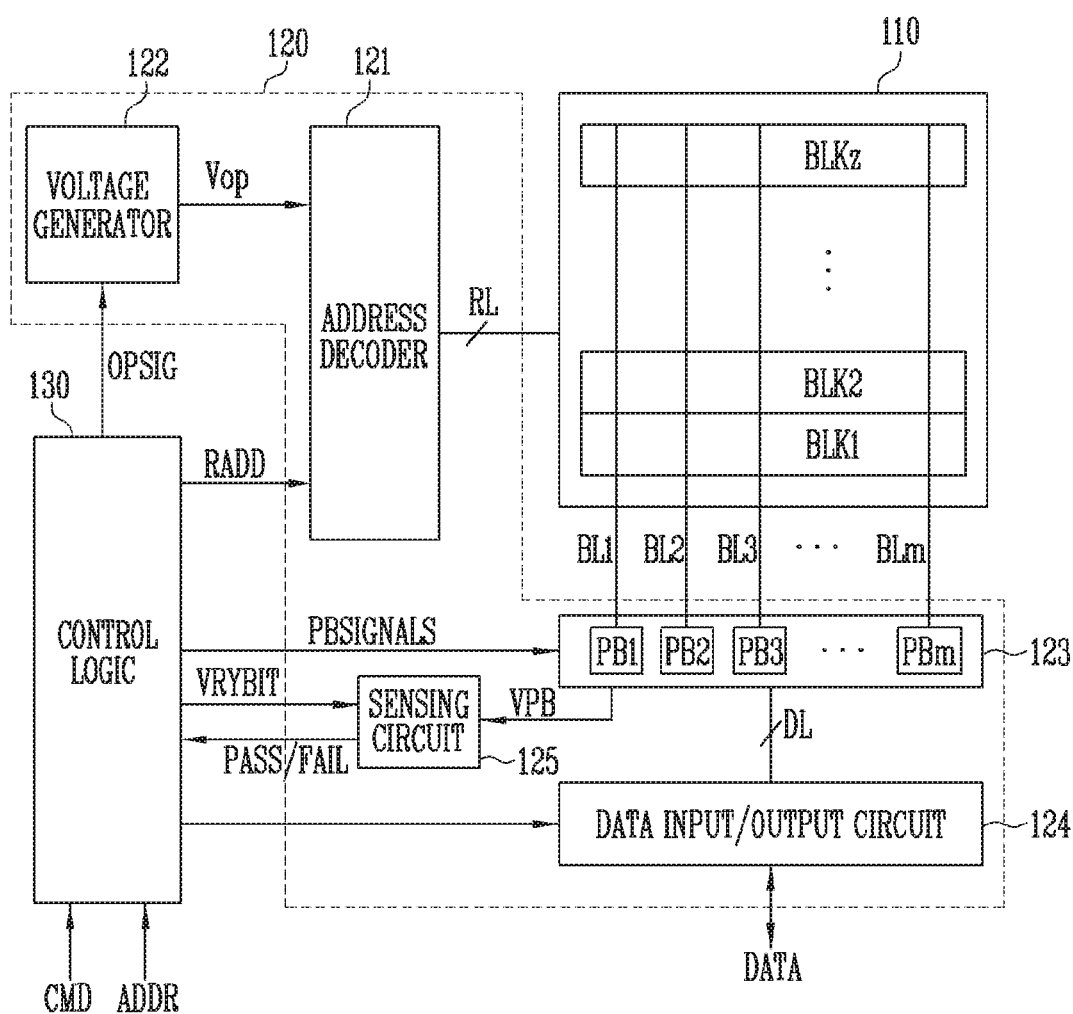
FIG. 2 is a diagram illustrating an example of a configuration of a memory device of FIG. 1.

FIG. 2 is a diagram illustrating an example of a configuration of a memory device of FIG. 1.

Referring to FIG. 2, the memory device 100 may include a memory cell array 110, a peripheral circuit 120, and a control logic 130.

The memory cell array 110 includes a plurality of memory blocks BLK1 to BLKz. The plurality of memory blocks BLK1 to BLKz are coupled to an address decoder 121 through row lines RL. The memory blocks BLK1 to BLKz are coupled to a read and write circuit 123 through bit lines BL1 to BLm. Each of the memory blocks BLK1 to BLKz includes a plurality of memory cells. In an embodiment, the plurality of memory cells are nonvolatile memory cells. Among the plurality of memory cells, memory cells coupled to the same word line are defined as a single physical page. That is, the memory cell array 110 is composed of a plurality of physical pages. In accordance with an embodiment of the present disclosure, each of the plurality of memory blocks BLK1 to BLKz included in the memory cell array 110 may include a plurality of dummy cells. "dummy cells" may refer to memory cells that are used for purposes other than storing data. For example, one or more dummy cells may be coupled in series between a drain select transistor and the memory cells and between a source select transistor and the memory cells to reduce unwanted interference between the drain/source select transistors and the memory cells.

Each of the memory cells of the memory device 100 may be implemented as a single-level cell (SLC) storing a single data bit, a multi-level cell (MLC) storing two data bits, a triple-level cell (TLC) storing three data bits, or a quad-level cell (QLC) storing four data bits.

The peripheral circuit 120 may include the address decoder 121, a voltage generator 122, the read and write circuit 123, a data input/output circuit 124, and a sensing circuit 125.

The peripheral circuit 120 may be used for I/O functions, power distribution, address decoding, etc. For example, the peripheral circuit 120 may drive word lines and bit lines to perform a program operation, a read operation, or an erase operation.

The address decoder 121 is coupled to the memory cell array 110 through row lines RL. The row lines RL may include drain select lines, word lines, source select lines, and a common source line. In accordance with an embodiment of the present disclosure, the word lines may include normal word lines and dummy word lines. In accordance with an embodiment of the present disclosure, the row lines RL may further include a pipe select line.

The control logic 130 controls the operations of the peripheral circuit 120. The control logic 130 controls the operations of the address decoder 121 by generating row addresses and column addresses based on addresses ADDR.

The address decoder 121 may decode the addresses ADDR to obtain a block address of a memory block. The address decoder 121 selects at least one memory block from among the memory blocks BLK1 to BLKz based on the decoded block address. The address decoder 121 is configured to decode addresses ADDR to obtain a row address RADD. The address decoder 121 may select at least one word line of the selected memory block by applying voltages supplied from the voltage generator 122 to at least one word line WL in response to the decoded row address RADD.

During a program operation, the address decoder 121 may apply a program voltage to the selected word line and apply a pass voltage having a level lower than that of the program voltage to unselected word lines. During a program verify operation, the address decoder 121 may apply a verify voltage to a selected word line and apply a verify pass voltage having a level higher than that of the verify voltage to unselected word lines.

During a read operation, the address decoder 121 may apply a read voltage to a selected word line and apply a read pass voltage having a level higher than that of the read voltage to unselected word lines.

In accordance with an embodiment of the present disclosure, the erase operation of the memory device 100 may be performed on a memory block basis. During an erase operation, the addresses ADDR input to the memory device 100 include a block address. The address decoder 121 may decode the block address and select a single memory block in response to the decoded block address, During the erase operation, the address decoder 121 may apply a ground voltage to word lines coupled to the selected memory block.

In accordance with an embodiment of the present disclosure, the address decoder 121 may decode a column address among the received addresses ADDR. The decoded column address may be transferred to the read and write circuit 123. In an embodiment, the address decoder 121 may include components such as a row decoder, a column decoder, and an address buffer.

The voltage generator 122 may generate a plurality of operating voltages Vop using an external supply voltage that is supplied to the memory device 100. The control logic 130 controls the operations of the voltage generator 122

In an embodiment, the voltage generator 122 may generate an internal supply voltage by regulating the external supply voltage. The internal supply voltage generated by the voltage generator 122 is used as an operating voltage for the memory device 100.

In an embodiment, the voltage generator 122 may generate the plurality of operating voltages Vop using the external supply voltage or the internal supply voltage. The voltage generator 122 may generate various voltages required by the memory device 100. For example, the voltage generator 122 may generate a plurality of erase voltages, a plurality of program voltages, a plurality of pass voltages, a plurality of select read voltages, and a plurality of unselect read voltages.

The voltage generator 122 may include a plurality of pumping capacitors for receiving the internal supply voltage. The voltage generator 122 may generate the plurality of operating voltages Vop having various voltage levels by selectively enabling the plurality of pumping capacitors.

The generated operating voltages Vop may be supplied to the memory cell array 110 by the address decoder 121.

The read and write circuit 123 includes first to m-th page buffers PB1 to PBm. The first to m-th page buffers PB1 to PBm are coupled to the memory cell array 110 through the first to m-th bit lines BL1 to BLm, respectively. The first to m-th page buffers PB1 to PBm may be operated under the control of the control logic 130.

The first to m-th page buffers PB1 to PBm may transmit/receive data DATA to/from the data input/output circuit 124. During a program operation, the first to m-th page buffers PB1 to PBm receive data DATA to be stored through the data input/output circuit 124 and data lines DL.

During a program operation, the first to m-th page buffers PB1 to PBm may transfer the data DATA to be stored, received through the data input/output circuit 124, to selected memory cells through the bit lines BL1 to BLm when a program pulse is applied to a selected word line. The memory cells in the selected page are programmed based on the received data DATA. Memory cells coupled to a bit line to which a program permission voltage (e.g., a ground voltage) is applied may have increased threshold voltages. The threshold voltages of memory cells coupled to a bit line to which a program inhibit voltage (e.g., a supply voltage) is applied may be maintained. During a program verify operation, the first to m-th page buffers PB1 to PBm may read data stored in selected memory cells from the selected memory cells through the bit lines BL1 to BLm.

During a read operation, the read and write circuit 123 may read data DATA from the memory cells in the selected page through the bit lines BL, and may store the read data DATA in the first to m-th page buffers PB1 to PBm.

During an erase operation, the read and write circuit 123 may allow the bit lines BL to float. In an embodiment, the read and write circuit 123 may include a column select circuit.

The data input/output circuit 124 is coupled to the first to m-th page buffers PB1 to PBm through the data lines DL. The data input/output circuit 124 is operated in response to the control of the control logic 130.

The data input/output circuit 124 may include a plurality of input/output buffers (not illustrated) which receive input data DATA. During a program operation, the data input/output circuit 124 receives the data DATA to be stored from an external controller (not illustrated). During a read operation, the data input/output circuit 124 outputs the data DATA, received from the first to m-th page buffers PB1 to PBm included in the read and write circuit 123, to the external controller.

During a read operation or a verify operation, the sensing circuit 125 may generate a reference current in response to an enable bit VRYBIT signal generated by the control logic 130, and may output a pass signal or a fail signal to the control logic 130 by comparing a sensing voltage VPB received from the read and write circuit 123 with a reference voltage generated by the reference current.

The control logic 130 may be coupled to the address decoder 1, the voltage generator 122, the read and write circuit 123, the data input/output circuit 124, and the sensing circuit 125. The control logic 130 may control the overall operation of the memory device 100. The control logic 130 may be operated in response to a command CMD transmitted from an external device.

The control circuit 130 may control the peripheral circuit 120 by generating various types of signals in response to the command CMD and the addresses ADDR. For example, the control logic 130 may generate an operation signal OPSIG, a row address RADD, read and write circuit control signals PBSIGNALS, and an enable bit VRYBIT in response to the command CMD and the addresses ADDR. The control logic 130 may output the operation signal OPSIG to the voltage generator 122, output the row address RADD to the address decoder 121, output the read and write circuit control signals PBSIGNALS to the read and write circuit 123, and output the enable bit VRYBIT to the sensing circuit 125. In addition, the control logic 130 may determine whether a verify operation has passed or failed in response to the pass or fail signal PASS or FAIL output from the sensing circuit 125.

Figure 3:
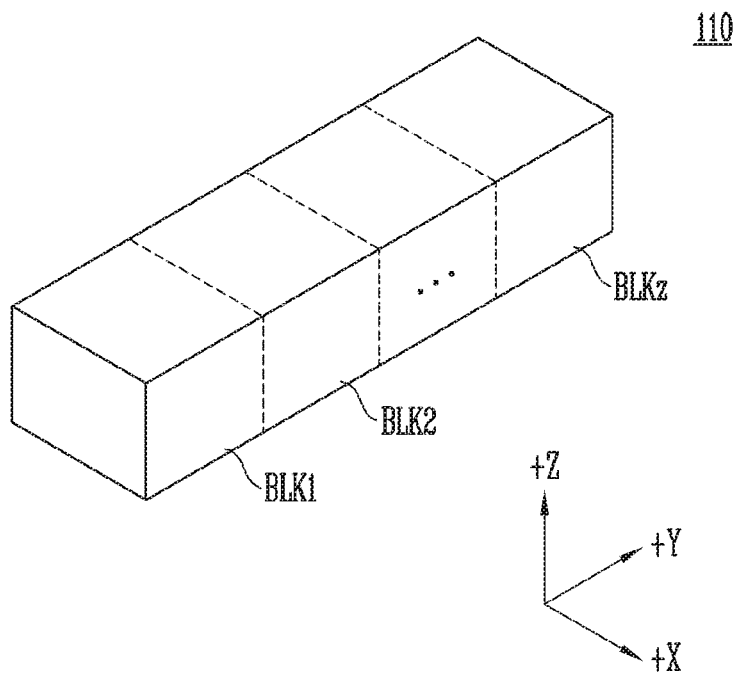
FIG. 3 is a diagram illustrating an example of a memory cell array of FIG. 2 based on an implementation of the disclosed technology.

FIG. 3 is a diagram illustrating an example of a memory cell array of FIG. 2.

Referring to FIG. 3, the memory cell array 110 includes a plurality of memory blocks BLK1 to BLKz. Each memory block may have a three-dimensional (3D) structure. Each memory block includes a plurality of memory cells stacked on a substrate. Such memory cells are arranged in a positive X (+X) direction, a positive Y (+Y) direction, and a positive Z (+Z) direction. The structure of each memory block will be described in detail below with reference to FIGS. 4 and 5.

Figure 4:
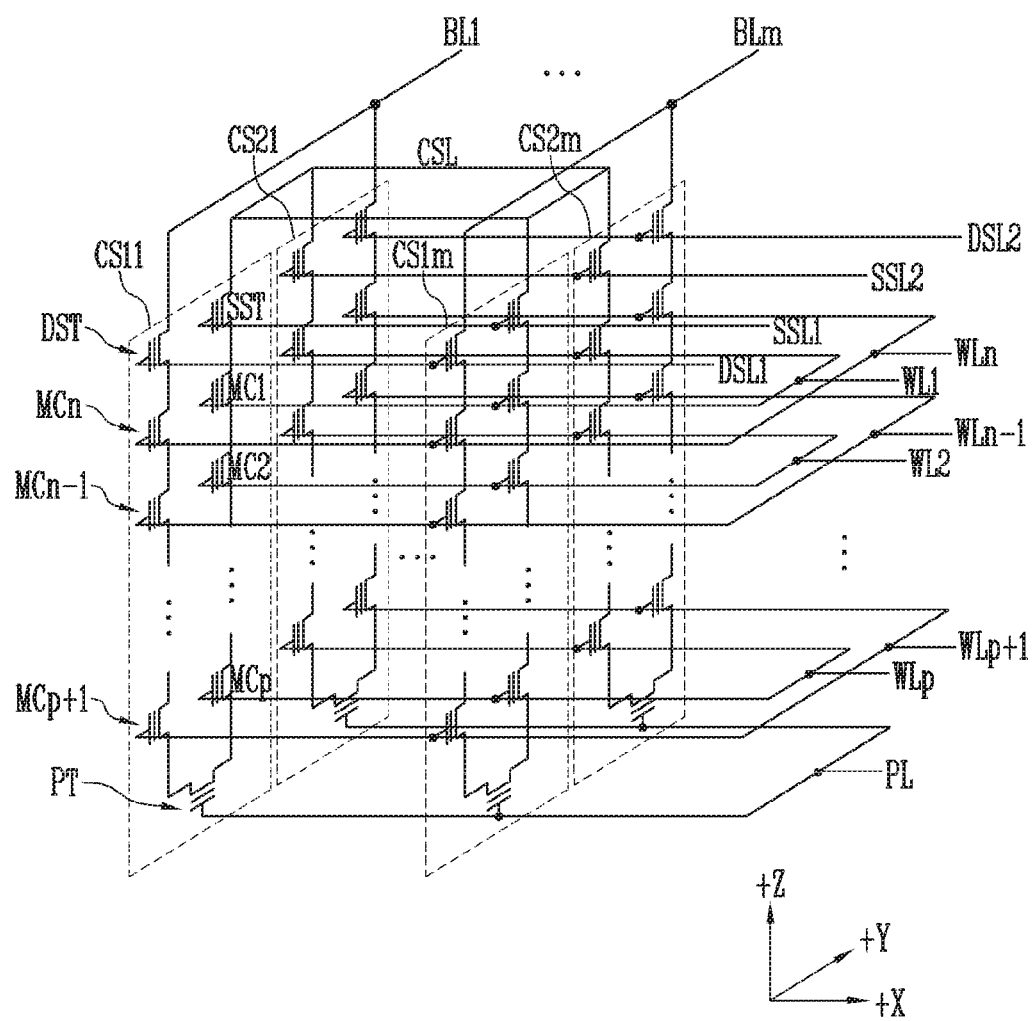
FIG. 4 is a circuit diagram illustrating an example of a memory block BLKa of memory blocks BLK1 to BLKz of FIG. 3 based on an implementation of the disclosed technology.

FIG. 4 is a circuit diagram illustrating any one memory block BLKa of the memory blocks BLK1 to BLKz of FIG. 3 based on some implementations of the disclosed technology.

Referring to FIG. 4, the memory block BLKa includes a plurality of cell strings CS11 to CS1*m* and CS21 to CS2*m*. In an embodiment, each of the cell strings CS11 to CS1*m* and CS21 to CS2*m* may be formed in a 'U' shape. In the memory block BLKa, m cell strings are arranged in a row direction (i.e. a positive (+) X direction). In FIG. 4, two cell strings are illustrated as being arranged in a column direction (i.e. a positive (+) Y direction). However, this illustration is made for convenience of description, and it will be understood that three or more cell strings may be arranged in the column direction.

Each of the plurality of cell strings CS11 to CS1*m* and CS21 to CS2*m* includes at least one source select transistor SST, first to n-th memory cells MC1 to MCn, a pipe transistor PT, and at least one drain select transistor DST.

The select transistors SST and DST and the memory cells MC1 to MCn may have similar structures, respectively. In an embodiment, each of the select transistors SST and DST and the memory cells MC1 to MCn may include a channel layer, a tunneling insulating layer, a charge storage layer, and a blocking insulating layer. In an embodiment, a pillar for providing the channel layer may be provided to each cell string. In an embodiment, a pillar for providing at least one of the channel layer, the tunneling insulating layer, the charge storage layer, and the blocking insulating layer may be provided to each cell string.

The source select transistor SST of each cell string is connected between the common source line CSL and memory cells MC1 to MCp.

In an embodiment, the source select transistors of cell strings arranged in the same row are coupled to a source select line extending in a row direction, and source select transistors of cell strings arranged in different rows are coupled to different source select lines. In FIG. 4, source select transistors of cell strings CS11 to CS1*m* in a first row are coupled to a first source select line SSL1. The source select transistors of cell strings CS21 to CS2*m* in a second row are coupled to a second source select line SSL2.

In an embodiment, source select transistors of the cell strings CS11 to CS1*m* and CS21 to CS2*m* may be coupled in common to a single source select line.

The first to n-th memory cells MC1 to MCn in each cell string are coupled between the source select transistor SST and the drain select transistor DST.

The first to n-th memory cells MC1 to MCn may be divided into first to p-th memory cells MC1 to MCp and p+1-th to n-th memory cells MCp+1 to MCn. The first to p-th memory cells MC1 to MCp are sequentially arranged in a direction opposite a positive (+) Z direction and are connected in series between the source select transistor SST and the pipe transistor PT. The p+1-th to n-th memory cells MCp+1 to MCn are sequentially arranged in the +Z direction and are connected in series between the pipe transistor PT and the drain select transistor DST. The first to p-th memory cells MC1 to MCp and the p+1-th to n-th memory cells MCp+1 to MCn are coupled to each other through the pipe transistor PT. The gates of the first to n-th memory cells MC1 to MCn of each cell string are coupled to first to n-th word lines WL1 to WLn, respectively.

A gate of the pipe transistor PT of each cell string is coupled to a pipeline PL.

The drain select transistor DST of each cell string is coupled between the corresponding bit line and the memory cells MCp+1 to MCn. The cell strings in a row direction are coupled to drain select lines extending in a row direction, Drain select transistors of cell strings CS11 to CS1m in the first row are coupled to a first drain select line DSL1. Drain select transistors of cell strings CS21 to CS2m in a second row are coupled to a second drain select line DSL2.

Cell strings arranged in a column direction are coupled to bit lines extending in a column direction. In FIG. 4, cell strings CS11 and CS21 in a first column are coupled to a first bit line BL1. Cell strings CS1m and CS2m in an m-th column are coupled to an m-th bit line BLm.

The memory cells coupled to the same word line in cell strings arranged in a row direction constitute a single page. For example, memory cells coupled to the first word line WL1, among the cell strings CS11 to CS1m in the first row, constitute a single page. Memory cells coupled to the first word line WL1, among the cell strings CS21 to CS2m in the second row, constitute a single additional page. Cell strings arranged in the direction of a single row may be selected by selecting any one of the drain select lines DSL1 and DSL2. A single page may be selected from the selected cell strings by selecting any one of the word lines WL1 to WLn.

In an embodiment, even numbered bit lines and odd numbered bit lines, instead of first to m-th bit lines BL1 to BLm, may be provided. Further, even-numbered cell strings among the cell strings CS11 to CS1m or CS21 to CS2m arranged in a row direction may be coupled to the even numbered bit lines. Odd-numbered cell strings among the cell strings CS11 to CS1m or CS21 to CS2m arranged in the row direction may be coupled to the odd numbered bit lines.

In an embodiment, one or more of the first to n-th memory cells MC1 to MCn may be used as dummy memory cells. For example, one or more dummy memory cells are provided to reduce an electric field between the source select transistor SST and the memory cells MC1 to MCp. Alternatively, the one or more dummy memory cells are provided to reduce an electric field between the drain select transistor DST and the memory cells MCp+1 to MCn. As more dummy memory cells are provided, the reliability of the operation of the memory block BLKa is improved, but the size of the memory block BLKa is increased. As fewer memory cells are provided, the size of the memory block BLKa is reduced, but the reliability of the operation of the memory block BLKa may be deteriorated.

In order to efficiently control the one or more dummy memory cells, each of the dummy memory cells may have a required threshold voltage. Before or after the erase operation of the memory block BLKa is performed, a program operation may be performed on all or some of the dummy memory cells. When an erase operation is performed after the program operation has been performed, the threshold voltages of the dummy memory cells control the voltages that are applied to the dummy word lines coupled to respective dummy memory cells, and thus the dummy memory cells may have required threshold voltages.

Figure 5:
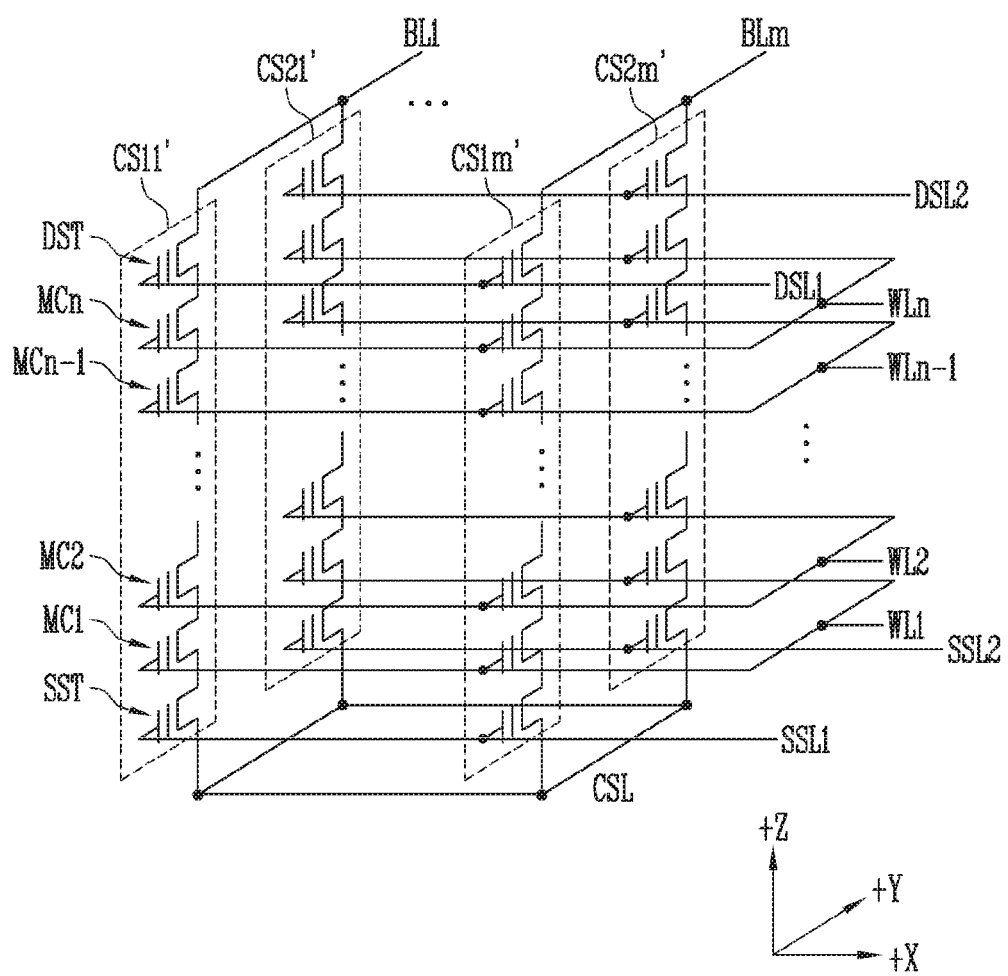
FIG. 5 is a circuit diagram illustrating an example of a memory block BLKb of memory blocks BLK1 to BLKz of FIG. 3 based on an implementation of the disclosed technology.

FIG. 5 is a circuit diagram illustrating an example of a memory block BLKb of memory blocks BLK1 to BLKz of FIG. 3.

Referring to FIG. 5, the memory block BLKb includes a plurality of cell strings CS11' to CS1m' and CS21' to CS2m'. Each of the plurality of cell strings CS11' to CS1m' and CS21' to CS2m' extends in a positive Z (+Z) direction. Each of the cell strings CS11' to CS1m' and CS21' to CS2m' includes at least one source select transistor SST, first to n-th memory cells MC1 to MCn, and at least one drain select transistor DST, which are stacked on a substrate (not illustrated) below the memory block BLKb.

The source select transistor SST of each cell string is connected between a common source line CSL and memory cells MC1 to MCn. The source select transistors of cell strings arranged in the same row are coupled to the same source select line. Source select transistors of cell strings CS11' to CS1m' arranged in a first row are coupled to a first source select line SSL1. Source select transistors of cell strings CS21' to CS2m' arranged in a second row are coupled to a second source select line SSL2. In an embodiment, source select transistors of the cell strings CS11' to CS1m' and CS21' to CS2m' may be coupled in common to a single source select line.

The first to n-th memory cells MC1 to MCn in each cell string are connected in series between the source select transistor SST and the drain select transistor DST. The gates of the first to n-th memory cells MC1 to MCn are coupled to first to n-th word lines WL1 to WLn, respectively.

The drain select transistor DST of each cell string is connected between the corresponding bit line and the memory cells MC1 to MCn. Drain select transistors of cell strings arranged in a row direction are coupled to drain select lines extending in a row direction. The drain select transistors of the cell strings CS11' to CS1m' in the first row are coupled to a first drain select line DSL1. The drain select transistors of the cell strings CS21' to CS2m' in the second row are coupled to a second drain select line DSL2.

As a result, the memory block BLKb of FIG. 5 has an equivalent circuit similar to that of the memory block BLKa of FIG. 4 except that a pipe transistor PT is excluded from each cell string.

In an embodiment, even numbered bit lines and odd numbered bit lines, instead of first to m-th bit lines BL1 to BLm, may be provided. Further, even-numbered cell strings among the cell strings CS11' to CS1m' or CS21' to CS2m' arranged in a row direction may be coupled to the even bit lines. Odd-numbered cell strings among the cell strings CS11' to CS1m' or CS21' to CS2m' arranged in the row direction may be coupled to the odd bit lines.

In an embodiment, one or more of the first to n-th memory cells MC1 to MCn may be used as dummy memory cells. For example, the one or more dummy memory cells are provided to reduce an electric field between the source select transistor SST and the memory cells MC1 to MCn. Alternatively, the one or more dummy memory cells are provided to reduce an electric field between the drain select transistor DST and the memory cells MC1 to MCn. As more dummy memory cells are provided, the reliability of the operation of the memory block BLKb is improved, but the size of the memory block BLKb is increased. As fewer memory cells are provided, the size of the memory block BLKb is reduced, but the reliability of the operation of the memory block BLKb may be deteriorated.

In order to efficiently control the one or more dummy memory cells, each of the dummy memory cells may have a required threshold voltage. Before or after the erase operation of the memory block BLKb is performed, a program operation may be performed on all or some of the dummy memory cells. When an erase operation is performed after the program operation has been performed, the threshold voltages of the dummy memory cells control the voltages that are applied to the dummy word lines coupled to respective dummy memory cells, and thus the dummy memory cells may have required threshold voltages.

Figure 6:
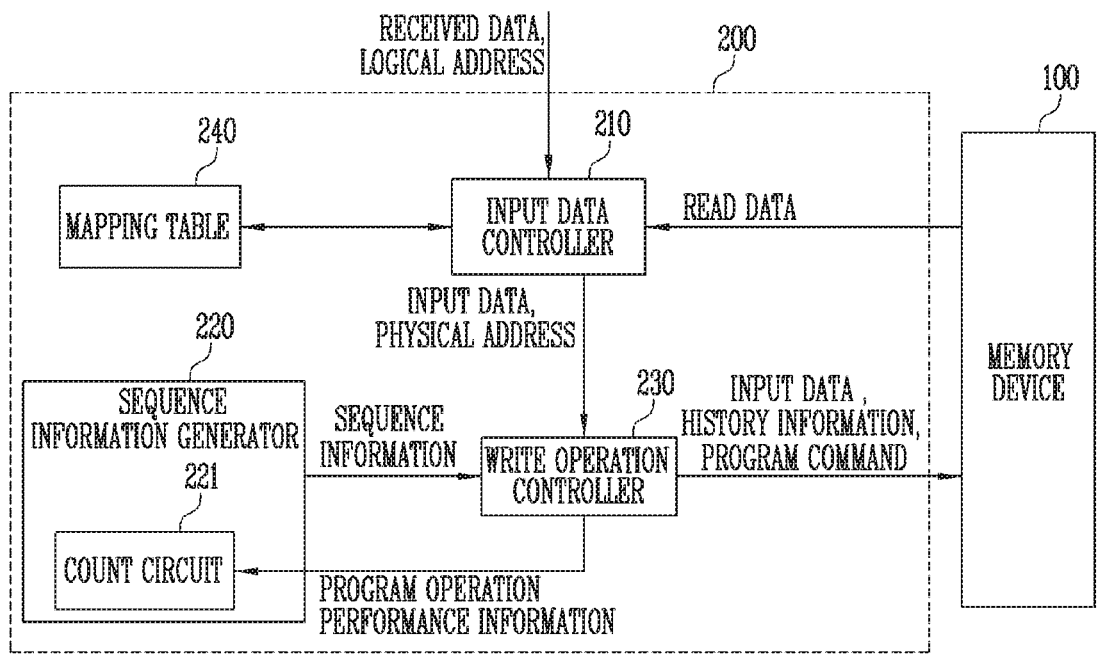
FIG. 6 is a diagram illustrating an example of a configuration of a memory controller based on an implementation of the disclosed technology.

FIG. 6 is a diagram illustrating an example of a configuration of a memory controller based on an implementation of the disclosed technology.

Referring to FIG. 6, a memory controller 200 may include an input data controller 210, a sequence information generator 220, a write operation controller 230, and a mapping table 240.

In an embodiment, as described above with reference to FIG. 1, the input data controller 210 may receive, from a host, data to be stored in a memory device 100 and a logical data storage address in which the data is to be stored. For example, the input data controller 210 may receive, from the host, the data to be stored in a page selected from a plurality of pages included in the memory device 100. Thus, the data which is received from the host may be stored in the selected page.

In an embodiment, the input data controller 210 may receive, from the memory device 100, the data to be stored in the memory device 100. In this case, the data received by the input data controller 210 from the memory device 100 may be stored in the page selected among the plurality of pages included in the memory device 100. To provide the data to be stored to the input data controller 210, the memory device 100 may first obtain such data by performing a read operation on another page of the memory device 100, which is different from the selected page of the memory device 100. Thus, the memory device 100 may obtain the data to be stored by reading the data from another page of the memory device 100 and then provide the read data to the input data controller 210 as the data to be stored in the selected page of the memory device 100.

The input data controller 210 may provide the data to be stored in the memory device 100 to the write operation controller 230 as an input data. The input data may have been received by the input data controller 210 from the host or the memory device 100. In an embodiment, the input data may be stored in the page selected among the plurality of pages included in the memory device 100.

The input data controller 210 may further provide the write operation controller 230 with a physical address of the memory device 100 in which the input data is to be stored. In some implementation, the physical address of the memory device 100 may be obtained based on the mapping table 240. In an embodiment, the physical address may be the physical address of the selected page in which the input data is to be stored.

The sequence information generator 220 may include a count circuit 221. The count circuit 221 may count the total number of program operations that have been performed by the memory device 100 based on program operation performance information provided from the write operation controller 230.

In an embodiment, the sequence information generator 220 may determine a sequence number (turn) in which a program operation of storing the input data in the selected page is to be performed. In some implementations, the sequence information generator 200 may determine the sequence number based on an operating status of the memory device 100, for example, the counted total number of program operations. In this case, the sequence information generator 220 may generate sequence information to include the determined sequence number.

The write operation controller 230 may control the memory device 100 so that the input data is stored in one or more pages included in the memory device 100. For example, the write operation controller 230 may provide the memory device 100 with a program command for storing the input data in a main area of the page selected among the plurality of pages included in the memory device 100 and storing history information in a spare area of the selected page.

In some implementations, the history information may include a logical address of the input data. In some implementations, the history information may include the physical address of the selected page in which the input data is to be stored and the sequence information corresponding to the input data.

The write operation controller 230 may generate program operation performance information indicating that the program operation of storing the input data has been performed by the memory device 100.

The mapping table 240 may include a physical address corresponding to the logical address of the input data. The physical address may indicate where in the memory device 100 the input data is to be stored. The physical address may indicate the physical address of the selected page in which the input data is to be stored. Each physical address may include a block index indicating a memory block including the selected page and a page index indicating a page selected among a plurality of pages included in the memory block.

In an embodiment, when the input data is divided into and stored in a plurality of pages, the input data controller 210 may divide the input data into one or more input data segments stored on the respective pages. The sequence information generator 220 may generate segment sequence information corresponding to any one or more input data segments.

The segment sequence information may indicate a sequence number in which a program operation of storing any data segment in the page selected among the plurality of pages is to be performed. The sequence information generator 220 may determine segment sequence information based on the total number of program operations performed by the memory device 100.

The write operation controller 230 may provide the memory device 100 with a program command instructing a program operation in which any data segment is stored in the main area of the selected page and in which history information is stored in the spare area of the selected page. The history information may include the physical address of the selected page and segment sequence information corresponding to any one data segment.

In an embodiment, a single page may include a plurality of sub-pages. Each of the plurality of sub-pages may include a main area and a spare area. An operation of reading or programming data may be performed on a sub-page basis.

The input data controller 210 may divide the input data into one or more input data segments, each being stored on a sub-page basis. The sequence information generator 220 may generate segment sequence information corresponding to any one of the one or more input data segments.

The segment sequence information may indicate a sequence number at which a program operation of storing any one data segment in a sub-page selected among a plurality of sub-pages included in the selected page is to be performed. The segment sequence information may be determined based on the total number of program operations performed by the memory device 100.

The write operation controller 230 may control the memory device 100 so that any one data segment is stored in a main area of the selected sub-page. The write operation controller 230 may control the memory device 100 so that history information including both the physical address of the selected sub-page and the segment sequence information are stored in a spare area of the selected sub-page.

Figure 7:
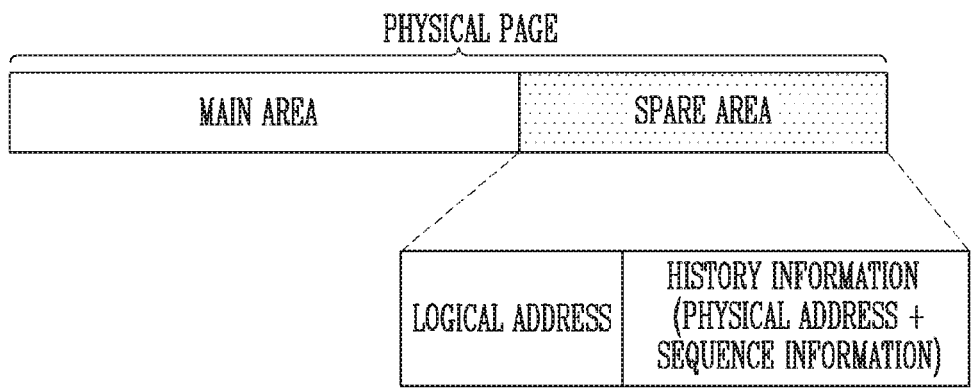
FIG. 7 is an example of a conceptual diagram of a physical page of FIG. 2 based on an implementation of the disclosed technology.

FIG. 7 is an example of a conceptual diagram of a physical page of FIG.

Referring to FIG. 7, a plurality of memory cells coupled to a single word line, which are described in FIG. 2, store data in a single physical page. A single physical page may include a main area and a spare area. The input data is stored in the main area of the physical page, and the information related to the input data is stored in the spare area of the physical page. In an embodiment, an access to the spare area may be limited, normal read command may not access the spare area and only preset command may be allowed to access the spare area. The preset command may include a command used to test the memory device and a command used to request data for analyzing the memory device.

In an embodiment, the input data may be stored in the main area of the physical page. The logical address of the input data may be stored in the spare area of the physical page. The logical address of the input data may be provided from a host, described above with reference to FIG. 1.

The history information, described above with reference to FIG. 6, may be stored in the spare area of the physical page. The history information may include the physical address of the physical page in which the input data is to be stored. The history information may include sequence information of the input data. The sequence information may include a sequence number indicating a sequential order in which a program operation of storing the input data in the physical page is to be performed. The sequential order may represent a relative sequential order of a program operation of storing the input data in the selected page among total program operations performed by the memory device 100. Thus, the sequence information may be determined based on the total number of program operations performed by the memory device 100.

Figure 8:
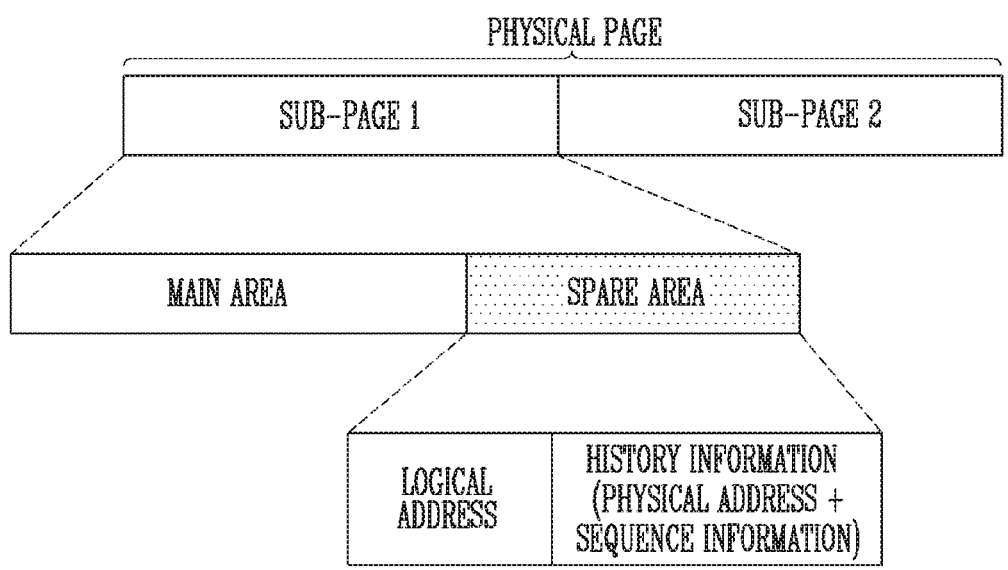
FIG. 8 is an example of a conceptual diagram of a physical page of FIG. 2 based on an implementation of the disclosed technology.

FIG. 8 is an example of a conceptual diagram of a physical page of FIG. 2.

Referring to FIG. 8, in comparison with the physical page of FIG. 7, a single physical page may include a plurality of sub-pages. Each of the plurality of sub-pages may include a main area and a spare area. In some implementations, an operation of reading or programming data may be performed on a sub-page basis.

In an embodiment, the physical page may include sub-page 1 and sub-page 2. The number of sub-pages included in a single physical page is not limited to two and other implementations are also possible.

Similar to the description made with reference to FIG. 7, input data may be stored in the main area of one sub-page. History information corresponding to the input data may be stored in the spare area of the sub-page. The history information may include a physical address of the sub-page in which the input data is to be stored and sequence information of the input data.

In an embodiment, the physical address of the sub-page may include a block index indicating a memory block including a selected page and a page index indicating the selected page, among a plurality of pages included in the memory block. The selected page may correspond to a physical page including the sub-page in which the input data is to be stored. In an embodiment, the physical address of the sub-page may include the block index and the page index. In addition, the physical address of the sub-page may include a sub-page index indicating a sub-page in which the user data is stored, among a plurality of sub-pages included in the selected page.

Figure 9:
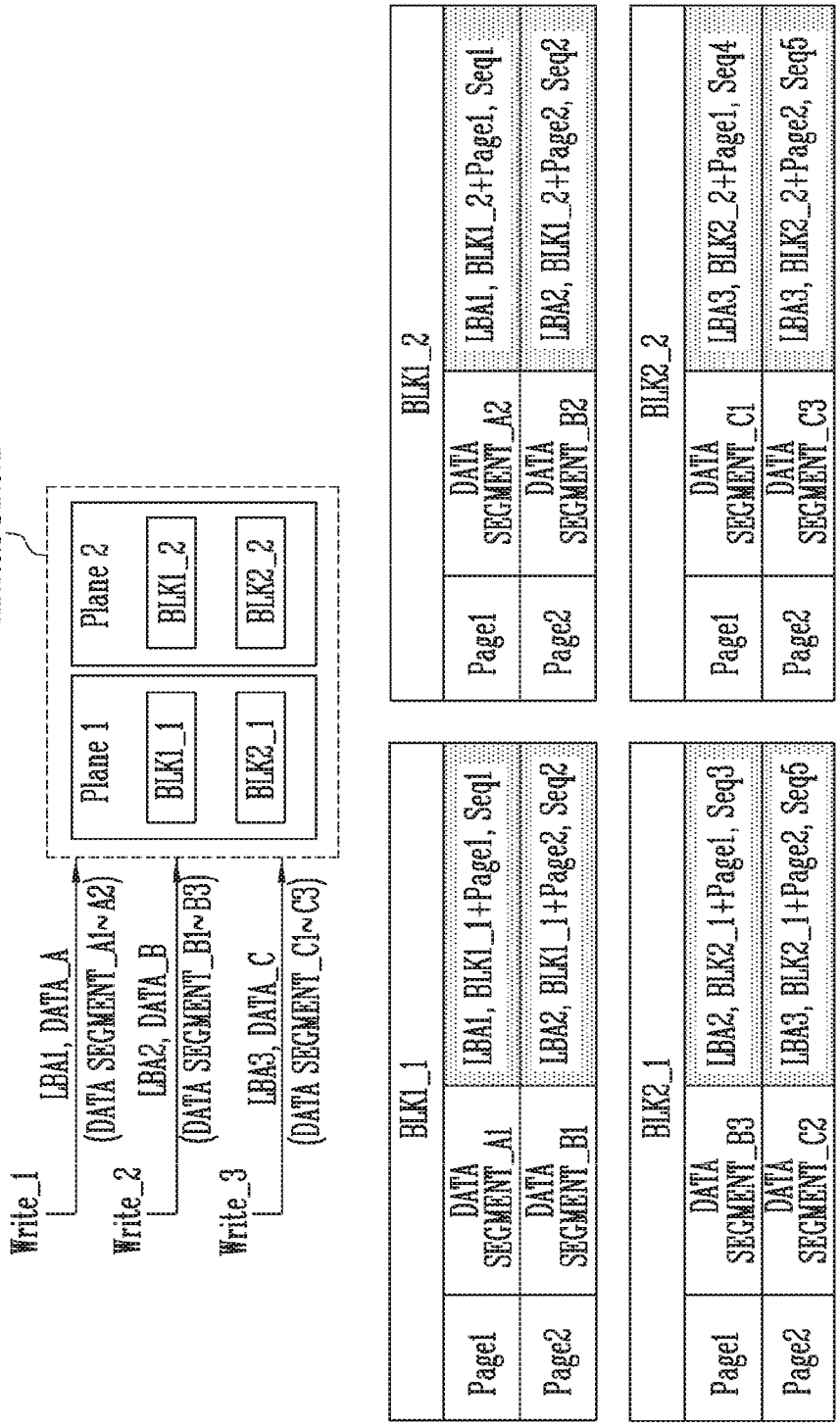
FIG. 9 is an example of a diagram illustrating an operation of storing data segments and corresponding history information based on an implementation of the disclosed technology.

FIG. 9 is an example of a diagram illustrating an operation of storing data segments and corresponding history information based on an implementation of the disclosed technology.

Referring to FIG. 9, a memory device may include a first plane Plane 1 and a second plane Plane 2. The first plane Plane 1 may include memory blocks BLK1_1 and BLK2_1. The second plane Plane 2 may include memory blocks BLK1_2 and BLK2_2. In FIG. 9, each of the memory blocks may include first and second pages Page1 and Page2.

The number of planes included in one memory device, the number of memory blocks included in one plane, and the number of pages included in one memory block are not limited to the implementation as shown in FIG. 9 and other implementations are also possible.

In an embodiment, the memory device may perform a multi-plane operation in which operations can be performed at the same time in multiple planes. For example, according to the multi-plane operation, data can be simultaneously stored in two or more memory blocks included in different planes. In another implementation, according to the multi-plane operation, data can be simultaneously read from two or more memory blocks included in different planes. Thus, the multiple-plain operation can be performed for simultaneously storing data in different planes or simultaneously reading data from different planes.

The memory controller 200, described above with reference to FIG. 1, may control the memory device 100 to write data in the memory device 100 based on a write request received from the host 300. In this case, the write data may be provided from the host 300.

The memory controller 200 may receive, from the host 300, a logical address of the data to be written. The memory controller 200 may control the memory device 100 so that the write data is stored at a physical address corresponding to the logical address of the write data. The physical address corresponding to the logical address of the write data may indicate a physical address of the memory device 100 in which the write data is to be stored.

In FIG. 9, each page may have the configuration as shown in FIG. 7. Therefore, a non-hatched portion in each page may indicate a main area of the page, and a hatched portion may indicate a spare area of the page.

The memory device receives a first write request Write 1 which instructs to store the first data DATA_A including data segments DATA SEGMENT A1 and DATA SEGMENT_A2 in response to the first write request Write_1, the program operations for storing data segments, DATA SEGMENT_A1 and DATA SEGMENT A2 may be performed in the memory device. In this case, the data segments DATA SEGMENT_A1 and DATA SEGMENT A2 may be stored on a page basis.

Since the memory device runs the multiple-plane operation, the program operations of storing data can be simultaneously performed in Plane 1 and Plane 2. Thus, in response to the first write request Write_1 to store two data segments, DATA SEGMENT_A1 and DATA SEGMENT A2, the program operations for storing DATA SEGMENT_A1 and DATA SEGMENT A_2 can be performed in the first page of the memory block BLK1_1 of the Plane 1 and the first page of the first memory block BLK1_2 of the Plane 2, respectively. Based on the multi-plane operation of the memory device, a program operation of storing the data segment DATA SEGMENT_A1 in the first page Page 1 of a memory block BLK1_1 and a program operation of storing the data segment DATA SEGMENT_A2 in the first page Page 1 of a memory block BLK1_2 can be simultaneously performed.

The data segment DATA SEGMENT_A1 may be stored in the main area of the first page Page 1 of the memory block BLK1_1. History information corresponding to the data segment DATA SEGMENT_A1 may be stored in the spare area of the first page Page 1 of the memory block BLK1_1.

In some implementations, the history information may include the logical address LBA1 of the first data DATA_A. In some implementations, the history information may include the physical address BLK1_1+Page1 of the page in which the data segment DATA SEGMENT_A1 is stored. The sequence information corresponding to the data segment DATA SEGMENT_A1 may be 1 since this program operation is performed for the first by the memory device in response to the first write request Write 1.

The data segment DATA SEGMENT_A2 may be stored in the main area of the first page Page 1 of the memory block BLK1_2. History information corresponding to the data segment DATA SEGMENT_A2 may be stored in the spare area of the first page Page 1 of the memory block LK1_2.

In some implementations, the history information may include the logical address LBA1 of the first data DATA_A. In some implementations, the history information may include the physical address BLK1_2+Page1 of the page in which the data segment DATA SEGMENT_A2 is stored. The sequence information corresponding to the data segment DATA SEGMENT_A2 may be 1 since this program operation is simultaneously performed with the performing of the program operation for storing data segment DATA SEGMENT A1 in response to the first write request Write 1.

Then, the memory device receives a second write request Write 2 which instructs to store the second data DATA_B including data segments DATA SEGMENT B1, DATA SEGMENT_B2, DATA SEGMENT_B3. In response to the second write request Write_2, the program operations for storing data segments, DATA SEGMENT B1, DATA SEGMENT_B2, DATA SEGMENT_B3 may be stored in the memory device. In this case, the data segments, DATA SEGMENT B1, DATA SEGMENT_B2, DATA SEGMENT_B3, may be stored on a page basis.

While the second write request Write 2 instructs the memory device to write three data segments, the memory device of FIG. 9 runs the multiple-plane operation with two planes. Thus, the memory device can firstly perform the program operations for storing two of three data segments, i.e., DATA SEGMENT B1, DATA SEGMENT_B2, in Plane 1 and Plane 2, respectively, and then perform the program operation for storing the remaining data segment, i.e., DATA SEGMENT B3, in Plane 1.

Based on the multi-plane operation of the memory device, the program operation of storing the data segment DATA SEGMENT_B1 in the second page Page 2 of the memory block BLK1_1 and the program operation of storing the data segment DATA SEGMENT_B2 in the second page Page 2 of the memory block BLK1_2 may be simultaneously performed. The DATA SEGMENTS_B1 and DATA SEGMENTS_B2 may be stored in the second page Page 2 of the memory blocks BLK1_1 and BLK 1_2 since data segments, DATA SEGMENT_A1 and DATA SEGMENT_A2, have been already stored in the first page Page 1 of the memory blocks BLK1_1 and BLK 1_2.

The data segment DATA SEGMENT_B1 may be stored in the main area of the second page Page 2 of the memory block BLK1_1. History information corresponding to the data segment DATA SEGMENT_B1 may be stored in the spare area of the second page Page 2 of the memory block BLK1_1.

In some implementations, the history information may include the logical address LBA2 of the second data DATA_B. In some implementations, the history information may include the physical address BLK1_1+Page2 of the page in which the data segments DATA SEGMENT_B1 is stored. The sequence information corresponding to the data segment DATA SEGMENT_B1 may be 2 since the program operation for storing the data segment DATA SEGMENT_B1 is performed by the memory device in the second place in response to the second write request Write 2 after the program operations for storing the data DATA_A.

The data segment DATA SEGMENT_B2 may be stored in the main area of the second page Page 2 of the memory block BLK1_2. History information corresponding to the data segment DATA SEGMENT_B2 may be stored in the spare area of the second page Page 2 of the memory block BLK1_2.

In some implementations, the history information may include the logical address LBA2 of the second data DATA_B. In some implementations, the history information may include the physical address BLK1_2+Page2 of the page in which the data segment DATA SEGMENT_B2 is stored. The sequence information corresponding to the data segment DATA SEGMENT_B2 may be 2 as same as that of the data segment DATA SEGMENT_B1.

The data segment DATA SEGMENT_B3 may be stored in the main area of the first page Page 1 of the memory block BLK2_1. History information corresponding to the data segment DATA SEGMENT_B3 may be stored in the spare area of the first page Page 1 of the memory block BLK2_1.

In some implementations, the history information may include the logical address LBA2 of the second data DATA_B. In some implementations, the history information may include the physical address BLK2_1+Page1 of the page in which the data segment DATA CHUNK_B3 is stored. The sequence information corresponding to the data segment DATA SEGMENT_B3 may be 3 since this program operation is performed by the memory device in the third place after the program operations for storing the data segments, DATA SEGMENT A1, DATA SEGMENT A2, DATA SEGMENT B_1, DATA SEGMENT B_2.

Then, the memory device receives a third write request Write 3 which instructs to store the third data DATA_C including data segments DATA SEGMENT C1, DATA SEGMENT_C2, DATA SEGMENT_C3. In response to the third write request Write 3, third data DATA_C may be stored in the memory device. The third data DATA_C may include data segments DATA SEGMENTs_C1 to C3 which are stored on a page basis.

The previous operation for storing the data segment DATA SEGMENT_B3 was performed in the first page Page 1 of the memory block BLK2_1 of Plane 1. Thus, the data segment DATA SEGMENT_C1 may be stored in the main area of the first page Page 1 of the memory block BLK2_2 of Plane 2. History information corresponding to the data segment DATA SEGMENT_C1 may be stored in the spare area of the first page Page 1 of the memory block BLK2_2.

In some implementations, the history information may include the logical address LBA3 of the third data DATA_C. In some implementations, the history information may include the physical address BLK2_2+Page1 of the page in which the data segment DATA SEGMENT_C1 is stored. The sequence information corresponding to the data segment DATA SEGMENT_C1 may be 4 since the program operation for storing the data segment DATA SEGMENT_C1 is performed by the memory device in the fourth place after the program operations for storing the data segments, DATA SEGMENT A1, DATA SEGMENT A2, DATA SEGMENT B_1, DATA SEGMENT B_3.

Based on the multi-plane operation of the memory device, the program operation of storing the data segment DATA SEGMENT_C2 in the second page Page 2 of the memory block BLK2_1 and the program operation of storing the data segment DATA SEGMENT_C3 in the second page Page 2 of the memory block BLK2_2 may be simultaneously performed.

The data segment DATA SEGMENT_C2 may be stored in the main area of the second page Page 2 of the memory block BLK2_1. History information corresponding to the data segment DATA SEGMENT_C2 may be stored in the spare area of the second page Page 2 of the memory block BLK2_1.

In some implementations, the history information may include the logical address LBA3 of the third data DATA_C. In some implementations, the history information may include the physical address BLK2_1+Page2 of the page in which the data segment DATA SEGMENT_C2 is stored. The sequence information corresponding to the data segment DATA SEGMENT_C2 may be 5 since this program operation for storing DATA SEGMENT_C2 performed in the fifth place by the memory device.

The data segment DATA SEGMENT_C3 may be stored in the main area of the second page Page 2 of the memory block BLK2_2. History information corresponding to the data segment DATA SEGMENT_C3 may be stored in the spare area of the second page Page 2 of the memory block BLK2_2.

In some implementations, the history information may include the logical address LBA3 of the third data DATA_C. In some implementations, the history information may include the physical address BLK2_2+Page2 of the page in which the data segment DATA SEGMENT_C3 is stored. The sequence information corresponding to the data segment DATA SEGMENT_C3 may be 5 since this operation for storing DATA SEGMENT_C3 is simultaneously performed as the operation for storing DATA SEGMENT_C2.

Figure 10:
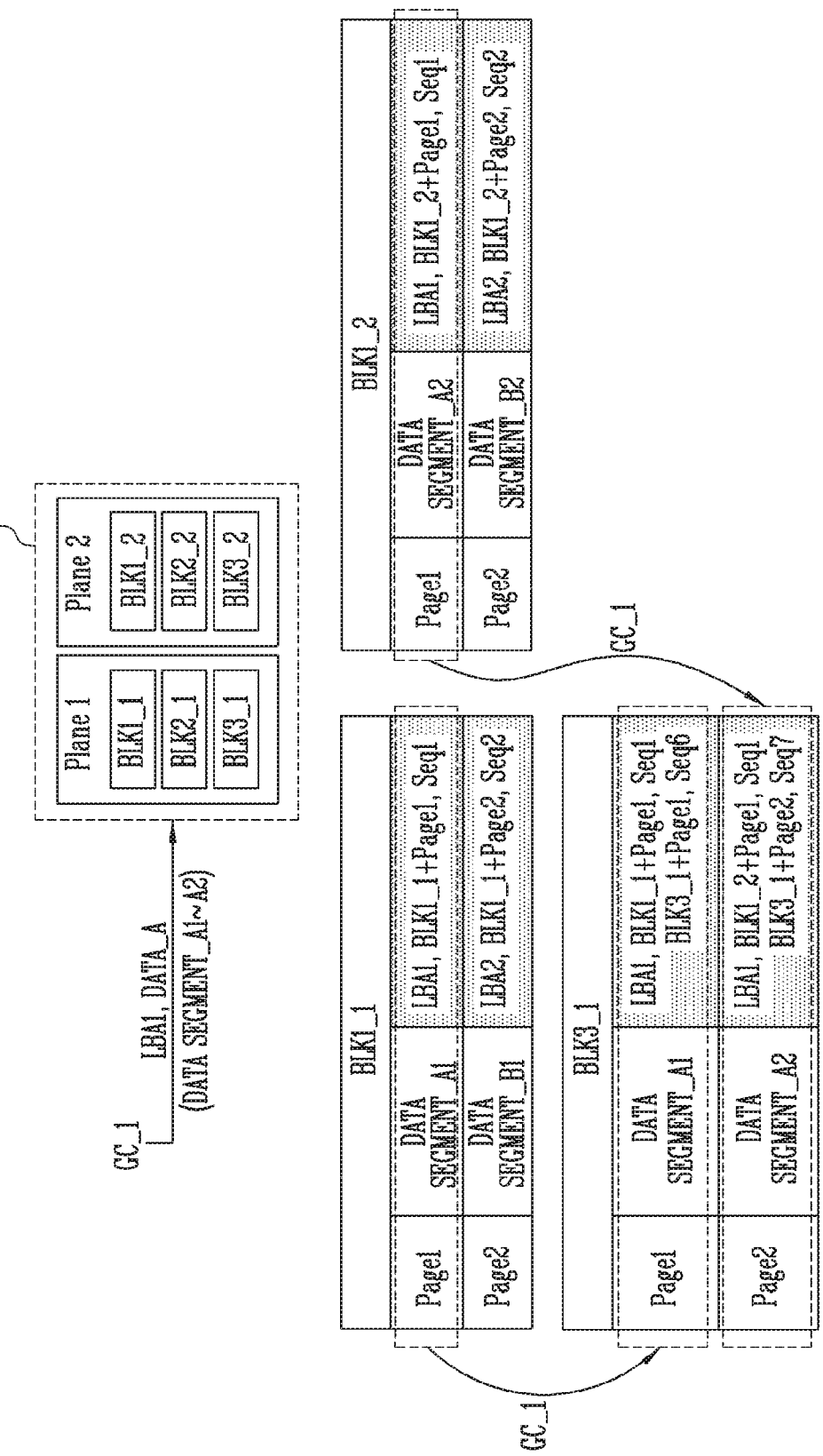
FIG. 10 is an example of a diagram illustrating a background operation based on an implementation of the disclosed technology.

FIG. 10 is an example of a diagram illustrating an background operation based on an implementation of the disclosed technology.

The memory device as shown in FIG. 10 includes a first plane Plane 1 and a second plane Plane 2, each plane including three memory blocks BLK1_1 to BLK3_1 and BLK1_2 to BLK3_2. For a simplicity of explanations, diagrams of the memory blocks BLK1_1, BLK1_2, BLK3_1 only are shown in FIG. 10, while the memory device has memory blocks BLK1_1 to BLK3_1 and BLK1_2 to BLK3_2. In addition, the memory blocks BLK1_1 and BLK1_2 of FIG. 10 have a same page structure as the memory blocks BLK1_1 and BLK1_2 of FIG. 9 and each page of memory blocks BLK1_1 and BLK1_2 of FIG. 10 includes same data and same history information as those in FIG. 9.

FIG. 10 illustrates an operation to cause data already stored in a first location of the memory device to be stored in a second location of the memory device. As a particular example of such operation, a background operation such as garbage collection can be discussed although other operations can be performed. When the background operation is performed, data stored in a specific area of the memory device may be shifted to and stored in an additional area of the memory device. The background operation may be performed based on the control of the memory controller irrespectively of a request received from the host, as described above with reference to FIG. 1.

In FIG. 10, a first garbage collection operation GC__1 is performed in the memory device based on the control of the memory controller. As shown in FIG. 10, the first garbage collection operation GC_1 causes data. DATA_A which includes DATA SEGMENT A1 and DATA SEGMENT_A2 to be additionally stored in the memory block BLK3_1. First, the operation for additionally storing DATA SEGMENT_A1 is performed. Before the first garbage collection operation GC1 is performed, DATA SEGMENT_A1 and DATA SEGMENT_A2 are stored in Page 1 of the memory block BLK1_1 and Page 1 of the memory block BLK1_2, respectively. According to the first garbage collection operation GC1, the data segment DATA SEGMENT_A1, stored in the main area of the first page Page 1 of a memory block BLK1_1, may be additionally stored in the main area of a first page Page 1 of a memory block BLK3_1.

For DATA SEGMENT_A1, which is stored in the main area of Page 1 of the memory block BLK1_1, the history information BLK1_1+Page1, Seq1 is stored in the spare area of Page 1 of the memory block BLK1_1. For DATA SEGMENT A1, which is stored in the main area of Page 1 of the memory block BLK3_1, the history information BLK3_1+Page1, Seq6 may be stored in the spare area of the first page Page 1 of the memory block BLK3_1.

After the DATA SEGMENT_A1 is stored in the page 1 of the memory block BLK3_1, the operation for additionally storing DATA SEGMENT_A2 is performed. According to the first garbage collection operation GC1, a data segment DATA SEGMENT_A2, stored in the main area of the first page Page 1 of the memory block BLK1_2, may be additionally stored in the main area of the second page Page 2 of the memory block BLK3_1.

For DATA SEGMENT A2, which is stored in the main area of Page 1 of the memory block BLK1_2, the history information BLK1_2+Page1, Seq1 is stored in the spare area of Page 1 of the memory block BLK1_2. For DATA SEGMENT_A2, which is stored in the main area of Page 2 of the memory block BLK3_1, the history information BLK3_1+Page2, Seq7 may be stored in the spare area of the second page Page 2 of the memory block BLK3_1.

In an embodiment, when a memory block is erased, history information stored in spare areas of pages included in the memory block may be deleted.

In an embodiment, when the spare area of the page in which data is stored is read, history information corresponding to the logical address of the corresponding data may be provided. If data has been stored in a page different from a current page, the history information may include the physical addresses of pages including the current page and the previous page in which the corresponding data was previously stored. In addition, the history information may further include sequence information including sequence numbers indicating sequential orders of the operations of storing data in the previous page and the current page. The history information of the data can provide helpful information to analyze the pattern of the program operations or failures of the memory device. In some implementations, the history information of the data can be utilized to test the performance of the memory device.

Figure 11:
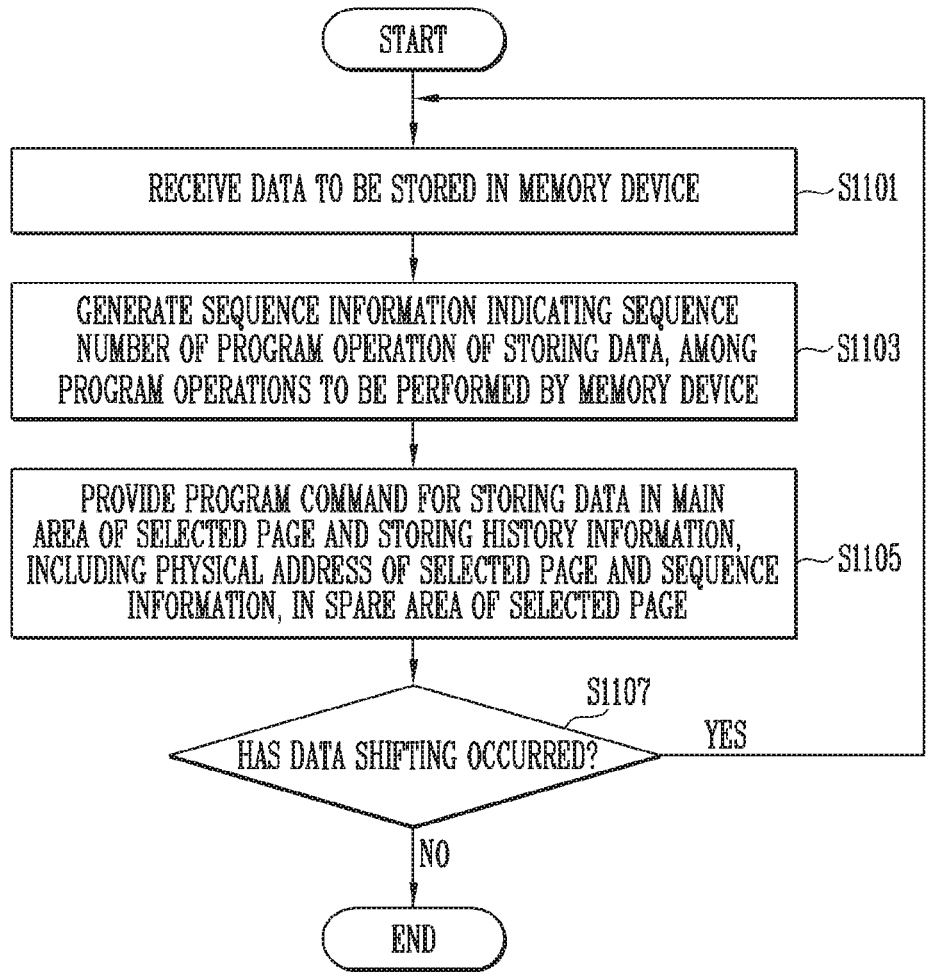
FIG. 11 is an example of a flowchart illustrating an operation of a memory controller based on an implementation of the disclosed technology.

FIG. 11 is a flowchart illustrating the operation of a memory controller according to an embodiment.

Referring to FIG. 11, at step S1101, the memory controller may receive data to be stored in a memory device. In some implementations, the data to be stored include data received from a host or data received from the memory device obtained by reading data stored in the memory device. In some implementations, the memory controller may provide, to the memory device, the data to be stored together with the address information of a corresponding page in which the memory is to be stored.

At step S1103, the memory controller may generate sequence information including a sequence number indicating a sequence order of a program operation of storing the data in the page in which the data is to be stored. The sequence order indicates a relative sequential order when the program operation for the storing the received data is to be performed among all the program operations to be performed by the memory device. Thus, in some implementations, the sequence information may be determined based on the total number of program operations performed by the memory device.

At step S1105, the memory controller may provide the memory device with a program command for storing data in a main area of a page and for storing history information including a physical address of the page and the sequence information in a spare area of the selected page.

At step S1107, the memory controller may determine whether an additional operation for the data to cause data stored in a specific area of the memory device to be shifted to another area of the memory device, has occurred. When it is determined that the shifting of the data has been caused by the occurrence of the additional operation, the process may return to step S1101, otherwise the process is terminated. The operation to cause the data shifting may include a background operation, such as a garbage collection operation.

Figure 12:
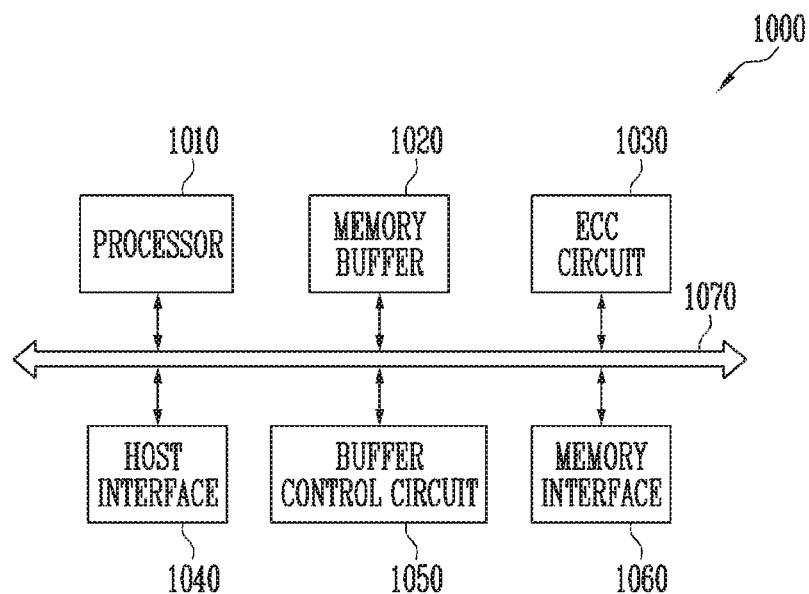
FIG. 12 is an example of a diagram illustrating a memory controller of FIG. 1 based on an implementation of the disclosed technology.

FIG. 12 is a diagram illustrating an embodiment of the memory controller of FIG. 1.

Referring to FIG. 12, a memory controller 1000 is coupled to a host and a memory device. In response to a request received from the host, the memory controller 1000 may access the memory device. For example, the memory controller 1000 may be configured to control write, read, erase, and background operations of the memory device. The memory controller 1000 may provide an interface between the memory device and the host. The memory controller 1000 may run firmware for controlling the memory device.

The memory controller 1000 may include a processor 1010, a memory buffer 1020, an error checking and correction (ECC) circuit 1030, a host interface 1040, a buffer control circuit 1050, a memory interface 1060, and a bus 1070.

The bus 1070 may provide channels between components of the memory controller 1000.

The processor 1010 may control the overall operation of the memory controller 1000 and may perform a logical operation. The processor 1010 may communicate with an external host through the host interface 1040 and also communicate with the memory device through the memory interface 1060. Further, the processor 1010 may communicate with the memory buffer 1020 through the buffer control circuit 1050. The processor 1010 may control the operation of the storage device by using the memory buffer 1020 as a working memory, a cache memory or a buffer memory.

The processor 1010 may perform the function of a flash translation layer (FTL). The processor 1010 may translate a logical block address (LBA), provided by the host, into a physical block address (PBA) through the FTL. The FTL may receive the LBA using a mapping table and translate the LBA into the PBA. Examples of an address mapping method performed through the FTL may include various methods according to a mapping unit. Representative address mapping methods include a page mapping method, a block mapping method, and a hybrid mapping method.

The processor 1010 may randomize data received from the host. For example, the processor 1010 may use a randomizing seed to randomize data received from the host. The randomized data may be provided, as data to be stored, to the memory device and may be programmed in the memory cell array.

The processor 1010 may derandomize data received from the memory device during a read operation. For example, the processor 1010 may derandomize the data received from the memory device using a derandomizing seed. The derandomized data may be output to the host.

In an embodiment, the processor 1010 may run software or firmware to perform randomizing and derandomizing operations.

The memory buffer 1020 may be used as a working memory, a cache memory, or a buffer memory of the processor 1010. The memory buffer 1020 may store codes and commands executed by the processor 1010. The memory buffer 1020 may store data that is processed by the processor 1010. The memory buffer 1020 may include a static RAM (SRAM) or a dynamic RAM (DRAM).

The Ecc circuit 1030 may perform error correction. The Ecc circuit 1030 may perform error correction code (ECC) encoding based on data to be written to the memory device through the memory interface 1060. The ECC-encoded data may be transferred to the memory device through the memory interface 1060. The Ecc circuit 1030 may perform ECC decoding based on data received from the memory device through the memory interface 1060. In an example, the Ecc circuit 1030 may be included as the component of the memory interface 1060 in the memory interface 1060.

The host interface 1040 may communicate with the external host under the control of the processor 1010. The host interface 1040 may perform communication using at least one of various communication methods such as Universal Serial Bus (USB), Serial AT Attachment (SATA) Serial Attached SCSI (SAS), High Speed Interchip (HSIC), Small Computer System interface (SCSI), Peripheral Component Interconnection (PCI), PCI express (PCIe), Nonvolatile Memory express (NVMe), Universal Flash Storage (UFS), Secure Digital (SD), MultiMedia Card (MMC), embedded MMC (eMMC), Dual In-line Memory Module (DIMM), Registered DIMM (RDIMM), and Load Reduced DIMM (LRDIMM) communication methods.

The buffer control circuit 1050 may control the memory buffer 1020 under the control of the processor 1010.

The memory interface 1060 may communicate with the memory device under the control of the processor 1010. The memory interface 1060 may transmit/receive commands, addresses, and data to/from the memory device through channels.

In an embodiment, the memory controller 1000 may not include the memory buffer 1020 and the buffer control circuit 1050.

In an embodiment, the processor 1010 may control the operation of the memory controller 1000 using codes. The processor 1010 may load codes from a nonvolatile memory device (e.g., ROM) provided in the memory controller 1000. In an embodiment, the processor 1010 may load codes from the memory device through the memory interface 1060.

In an embodiment, the bus 1070 of the memory controller 1000 may be divided into a control bus and a data bus. The data bus may be configured to transmit data in the memory controller 1000, and the control bus may be configured to transmit control information such as commands or addresses in the memory controller 1000. The data bus and the control bus may be isolated from each other, and may neither interfere with each other nor influence each other. The data bus may be coupled to the host interface 1040, the buffer control circuit 1050, the Ecc circuit 1030, and the memory interface 1060. The control bus may be coupled to the host interface 1040, the processor 1010, the buffer control circuit 1050, the memory buffer 1020, and the memory interface 1060.

Figure 13:
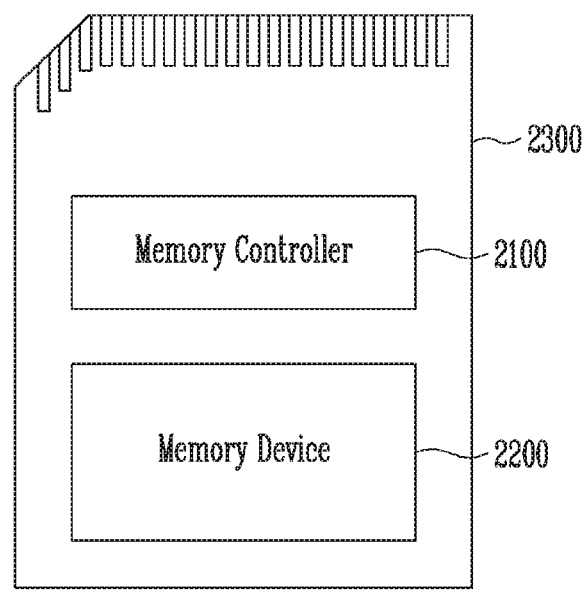
FIG. 13 is an example of a block diagram illustrating a memory card system including a storage device provided based on an implementation of the disclosed technology is applied.

FIG. 13 is a block diagram illustrating a memory card system including a storage device implemented based on an embodiment of the disclosed technology.

Referring to FIG. 13, a memory card system 2000 may include a memory controller 2100, a memory device 2200, and a connector 2300.

The memory controller 2100 is coupled to the memory device 2200. The memory controller 2100 may access the memory device 2200. For example, the memory controller 2100 may be control read, write, erase, and background operations of the memory device 2200. The memory controller 2100 may provide an interface between the memory device 2200 and a host. The memory controller 2100 may run firmware for controlling the memory device 2200. The memory controller 2100 may be implemented in the same way as the memory controller 200 described above with reference to FIG. 1.

In an embodiment, the memory controller 2100 may include components, such as a RAM, a processing unit, a host interface, a memory interface, and an Ecc circuit.

The memory controller 2100 may communicate with an external device through the connector 2300. The memory controller 2100 may communicate with an external device (e.g., a host) based on a specific communication protocol. In an embodiment, the memory controller 2100 may communicate with the external device through at least one of various communication protocols such as universal serial bus (USB), multimedia card (MMC), embedded MMC (eMMC), peripheral component interconnection (PCI), PCI-express (PCI-E), advanced technology attachment (ATA), serial-ATA (SATA), parallel-ATA (PATA), small computer small interface (SCSI), enhanced small disk interface (ESDI), integrated drive electronics (IDE), Firewire, universal flash storage (UFS), Wi-Fi, Bluetooth, and nonvolatile memory express (NVMe) protocols. In an embodiment, the connector 2300 may be defined by at least one of the above-described various communication protocols.

In an embodiment, the memory device 2200 may be implemented as any of various nonvolatile memory devices, such as an Electrically Erasable and Programmable ROM (EEPROM), a NAND flash memory, a NOR flash memory, a Phase-change RAM (PRAM), a Resistive RAM (ReRAM), a Ferroelectric RAM (FRAM), a Spin-Torque Magnetic RAM (STT-MRAM).

The memory controller 2100 and the memory device 2200 may be integrated into a single semiconductor device to configure a memory card. For example, the memory controller 2100 and the memory device 2200 may be integrated into a single semiconductor device to configure a memory card such as a PC card (personal computer memory card international association: PCMCIA), a compact flash card (CF), a smart media card (SM or SMC), a memory stick, a multimedia card (MMC, RS-MMC, MMCmicro or eMMC), a SD card (SD, miniSD, microSD, or SDHC), or a universal flash storage (UPS).

Figure 14:
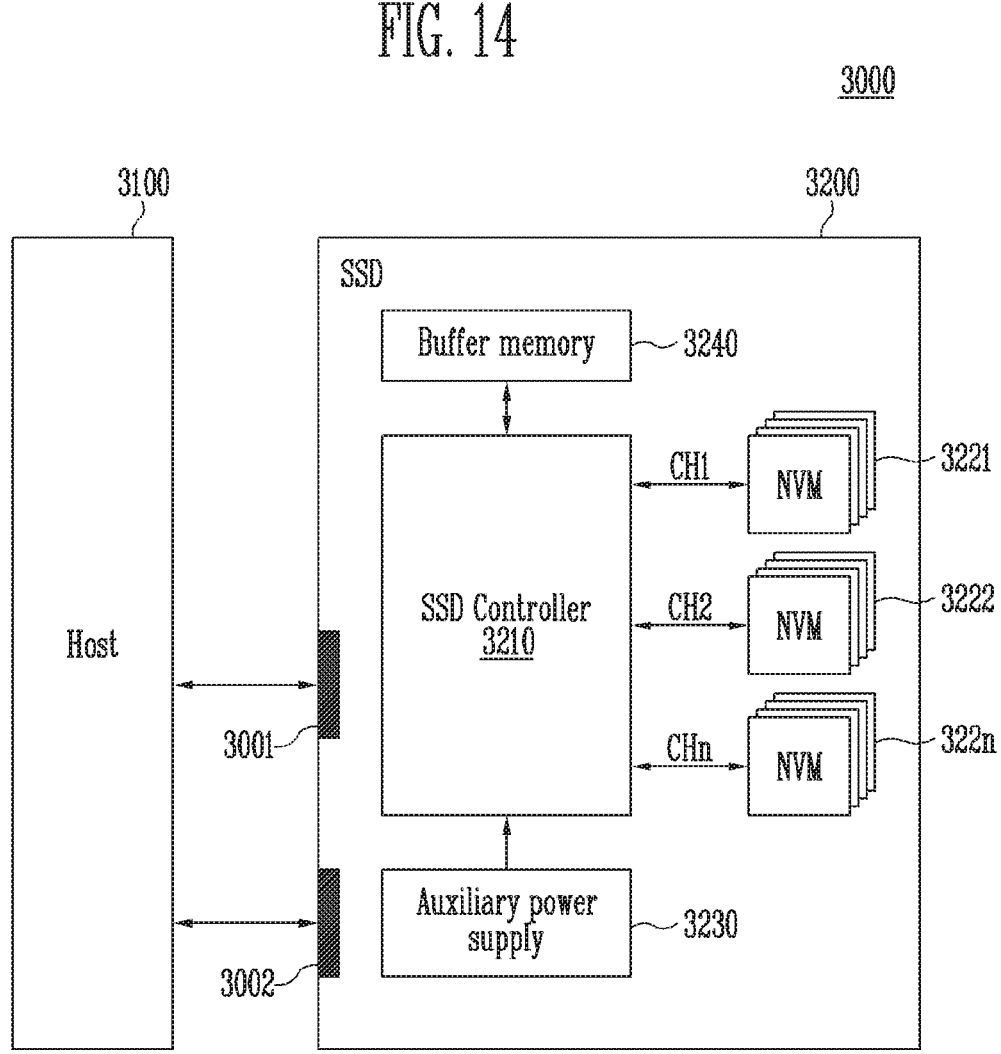
FIG. 14 is an example of a block diagram illustrating a solid state drive (SSD) system including a storage device provided based on an implementation of the disclosed technology.

FIG. 14 is a block diagram illustrating a solid state drive (SSD) system including a storage device implemented based on an embodiment of the disclosed technology.

Referring to FIG. 14, an SSD system 3000 may include a host 3100 and an SSD 3200. The SSD 3200 may exchange signals SIG with the host 3100 through a signal connector 3001 and may receive power PWR through a power connector 3002. The SSD 3200 may include an SSD controller 3210, a plurality of flash memories 3221 to 322n, an auxiliary power supply 3230, and a buffer memory 3240.

In accordance with an embodiment of the present disclosure, the SSD controller 3210 may perform the function of the memory controller 200 described above with reference to FIG. 1.

The SSD controller 3210 may control the plurality of flash memories 3221 to 322n in response to the signals SIG received from the host 3100. In an embodiment, the signals SIG may be signals based on the interfaces of the host 3100 and the SSD 3200. For example, the signals SIG may be signals defined by at least one of various interfaces such as universal serial bus (USB), multimedia card (MMC), embedded MMC (eMMC), peripheral component interconnection (PCI), PCI-express (PCI-E), advanced technology attachment (ATA), serial-ATA (SATA), parallel-MA (DATA), small computer small interface (SCSI), enhanced small disk interface (ESDI), integrated drive electronics (IDE), Firewire, universal flash storage (UFS), Wi-Fi, Bluetooth, and nonvolatile memory express (NVMe) interfaces.

The auxiliary power supply 3230 may be coupled to the host 3100 through the power connector 3002. The auxiliary power supply 3230 may be supplied with power PWR from the host 3100 and may be charged. The auxiliary power supply 3230 may supply the power of the SSD 3200 when the supply of power from the host 3100 is not smoothly performed. In an embodiment, the auxiliary power supply 3230 may be positioned inside the SSD 3200 or positioned outside the SSD 3200. For example, the auxiliary power supply 3230 may be disposed in a main board and may supply auxiliary power to the SSD 3200.

The buffer memory 3240 functions as a buffer memory of the SSD 3200. For example, the buffer memory 3240 may temporarily store data received from the host 3100 or data received from the plurality of flash memories 3221 to 322n or may temporarily store metadata (e.g., mapping tables) of the flash memories 3221 to 322n. The buffer memory 3240 may include volatile memories such as DRAM, SDRAM, DDR SDRAM, LPDDR SDRAM, and GRAM or nonvolatile memories such as FRAM, ReRAM, STT-MRAM, and PRAM.

Figure 15:
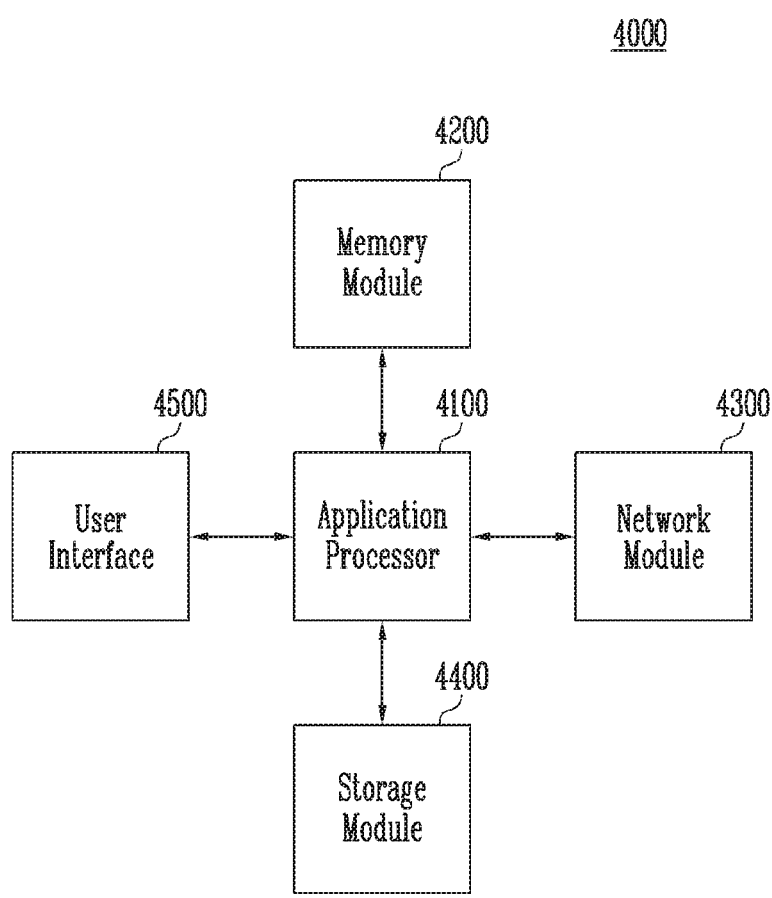
FIG. 15 is a block diagram illustrating an example of a user system including a storage device provided based on an implementation of the disclosed technology.

FIG. 15 is a block diagram illustrating a user system including a storage device implemented based on an embodiment of the disclosed technology.

Referring to FIG. 15, a user system 4000 may include an application processor 4100, a memory module 4200, a network module 4300, a storage module 4400, and a user interface 4500.

The application processor 4100 may run components included in the user system 4000, an Operating System (OS) or a user program. In an embodiment, the application processor 4100 may include controllers, interfaces, graphic engines, etc. for controlling the components included in the user system 4000. The application processor 4100 may be provided as a system-on-chip (SoC).

The memory module 4200 may function as a main memory, a working memory, a buffer memory or a cache memory of the user system 4000. The memory module 4200 may include volatile RAMs such as DRAM, SDRAM, DDR SDRAM, DDR2 SDRAM, DDR3 SDRAM, LPDDR SDRAM, LPDDR2 SDRAM, and LPDDR3 SDRAM, or nonvolatile RAMs such as PRAM, ReRAM, MRAM, and FRAM. In an embodiment, the application processor 4100 and the memory module 4200 may be packaged based on package-on-package (POP) and may then be provided as a single semiconductor package.

The network module 4300 may communicate with external devices. For example, the network module 4300 may support wireless communication, such as Code Division Multiple Access (CDMA), Global System for Mobile communication (GSM), wideband CDMA (WCDMA), CDMA-2000, Time Division Multiple Access (TDMA), Long Term Evolution (LTE), WiMax, WLAN, UWB, Bluetooth, or Wi-Fi communication. In an embodiment, the network module 4300 may be included in the application processor 4100.

The storage module 4400 may store data. For example, the storage module 4400 may store data received from the application processor 4100. Alternatively, the storage module 4400 may transmit the data stored in the storage module 4400 to the application processor 4100. In an embodiment, the storage module 4400 may be implemented as a nonvolatile semiconductor memory device, such as a Phase-change RAM (PRAM), a Magnetic RAM (MRAM), a Resistive RAM (RRAM), a NAND flash memory, a NOR flash memory, or a NAND flash memory having a three-dimensional (3D) structure. In an embodiment, the storage module 4400 may be provided as a removable storage medium (i.e., removable drive), such as a memory card or an external drive of the user system 4000.

In an embodiment, the storage module 4400 may include a plurality of nonvolatile memory devices, each of which may be operated in the same way as the memory device 100 described above with reference to FIG. 1. The storage module 4400 may be operated in the same way as the storage device 50 described above with reference to FIG. 1.

The user interface 4500 may include interfaces which input data or instructions to the application processor 4100 or output data to external device. In an embodiment, the user interface 4500 may include user input interfaces such as a keyboard, a keypad, a button, a touch panel, a touch screen, a touch pad, a touch ball, a camera, a microphone, a gyroscope sensor, a vibration sensor, and a piezoelectric device. The user interface 4500 may further include user output interfaces such as a Liquid Crystal Display (LCD), an Organic Light Emitting Diode (OLED) display device, an Active Matrix OLED (AMOLED) display device, an LED, a speaker, and a motor.

In accordance with the various implementations of the disclosed technology, when data is stored in the memory device, history information associated with the data is stored together with the data. This history information can be utilized to analyze the memory device. For example, the history information can provide timing information of operations (e.g., relative orders of the operations performed in the memory device) and any relationship among pages of memory blocks (e.g., when data is shifted from an original page to another page). Thus, it is possible to provide a storage device and its operating method, which have improved capabilities including operation pattern analysis and failure analysis.

What is claimed is:

1. A memory controller for controlling a memory device including a plurality of pages, the memory controller comprising:

an input data controller configured to receive data to be stored in a first page selected among the plurality of pages;

a sequence information generator configured to generate sequence information indicating a sequential order of a program operation of storing the data in the first page based on sequential orders of program operations performed before the program operation; and a write operation controller configured to control the memory device to store the data in a first area of the first page and to store history information in a second area of the first page, wherein the history information includes a physical address of the first page and the sequence information corresponding to the data, and wherein the write operation controller is further configured to control the memory device, in response to an operation that causes the data stored in the first page to be shifted to a second page, to store additional history information that includes a physical address of the second page and sequence information corresponding to the second page.

2. The memory controller according to claim 1, wherein the first area and the second area correspond to a main area and a spare area of the first page, respectively.

3. The memory controller according to claim 1, wherein the input data controller is configured to receive the data from a host device.

4. The memory controller according to claim 3, wherein the input data controller is configured to receive a logical address of the data from the host device.

5. The memory controller according to claim 4, wherein the history information includes the logical address of the data.

6. The memory controller according to claim 1, wherein the input data controller is configured to receive the data from the memory device.

7. The memory controller according to claim 4, further comprising:

a mapping table configured to store mapping information between the logical address of the data and the physical address of the first page.

8. The memory controller according to claim 7, wherein the input data controller is configured to refer to the mapping table to provide the physical address of the first page corresponding to the logical address to the write operation controller.

9. The memory controller according to claim 1, wherein the sequence information generator is configured to generate the sequence information based on a total number of program operations performed by the memory device.

10. The memory controller according to claim 9, wherein the sequence information generator comprises a count circuit configured to count the total number of the program operations.

11. The memory controller according to claim 10, wherein the write operation controller is configured to generate program operation performance information indicating that the program operation of storing the data in the first page has been performed.

12. The memory controller according to claim 11, wherein the count circuit is configured to count the total number of the program operations based on the program operation performance information.

13. The memory controller according to claim 1, wherein the second area of the first page is accessed in response to a preset command.

14. A storage device, comprising:
a memory device including a plurality of pages, each page including a first area and a second area, and configured to perform a program operation of storing data in a first page selected from among the plurality of pages; and
a memory controller configured to generate sequence information indicating a sequential order of the program operation of storing the data in the first page, based on sequential orders of program operations performed before the program operation, and to control the memory device to store the data in a first area of the first page and history information including a physical address of the first page and the sequence information in a second area of the first page,
wherein the memory controller is further configured to control the memory device, in response to an operation that causes the data stored in the first page to be shifted to a second page, to store additional history information that includes a physical address of the second page and sequence information corresponding to the second page.

15. The storage device according to claim 14, wherein the memory controller is configured to generate the sequence information based on a total number of program operations that have been previously performed in the memory device.

16. The storage device according to claim 14, wherein:
the memory controller is configured to access the second area of the first page in response to a preset command received from a host, and
the preset command includes a command used to test the memory device and a command used to request data for analyzing the memory device.

* * * * *